United States Patent
Sugiyama et al.

(10) Patent No.: US 7,110,643 B2
(45) Date of Patent: Sep. 19, 2006

(54) MICRO LENS ARRAY AND A METHOD OF MANUFACTURING A REPLICATION MOLD FOR THE SAME

(75) Inventors: Masahiko Sugiyama, Yokohama (JP); Masaru Segawa, Yokohama (JP); Yoichiro Nakatani, Mito (JP)

(73) Assignee: Victor Company of Japan, Limited., Yokohama (JP)

( * ) Notice: Subject to any disclaimer, the term of this patent is extended or adjusted under 35 U.S.C. 154(b) by 0 days.

(21) Appl. No.: 11/049,633

(22) Filed: Feb. 3, 2005

(65) Prior Publication Data

US 2005/0180690 A1 Aug. 18, 2005

(30) Foreign Application Priority Data

Feb. 6, 2004 (JP) .......................... P2004-030594
Dec. 16, 2004 (JP) .......................... P2004-364962

(51) Int. Cl.
*G02B 6/32* (2006.01)

(52) U.S. Cl. ...................................................... 385/33

(58) Field of Classification Search ...................... None
See application file for complete search history.

(56) References Cited

U.S. PATENT DOCUMENTS 6,014,232 A * 1/2000 Clarke ........................ 358/482

6,867,927 B1 * 3/2005 Bourdelais et al. ......... 359/707

FOREIGN PATENT DOCUMENTS

| JP | 05-313252 | 11/1993 |
|---|---|---|
| JP | 05313252 A * | 11/1993 |
| JP | 07-063904 | 3/1995 |
| JP | 10-062604 | 3/1998 |
| JP | 2001-305315 | 10/2001 |

* cited by examiner

*Primary Examiner*—Juliana Kang
(74) *Attorney, Agent, or Firm*—Nath & Associates PLLC; Gregory B. Kang; Stanely N. Protigal

(57) ABSTRACT

The micro-lens array in which a plural of convexly-protruded micro-lens are closely arranged two-dimensionally and a plural of convex sub-lenses having a curvature-radius smaller than that of the micro-lens are protrusively formed on the surface of each micro-lens has a large view angle, since $D_{sav}/D$ is in a range from 0.1 to 0.3 where D is the micro-lens bottom face width obtained by halving the summation of the maximum and the minimum width which are measured along the line passing through the center of the bottom face of the micro-lens; $D_s$ is the sub-lens bottom face width obtained by halving the summation of the maximum and the minimum width which are measured along the line passing through the center of the bottom face of the sub-lens; and $D_{sav}$ is the average sub-lens bottom face width obtained by averaging a plural of the sub-lens bottom face widths $D_s$.

3 Claims, 16 Drawing Sheets

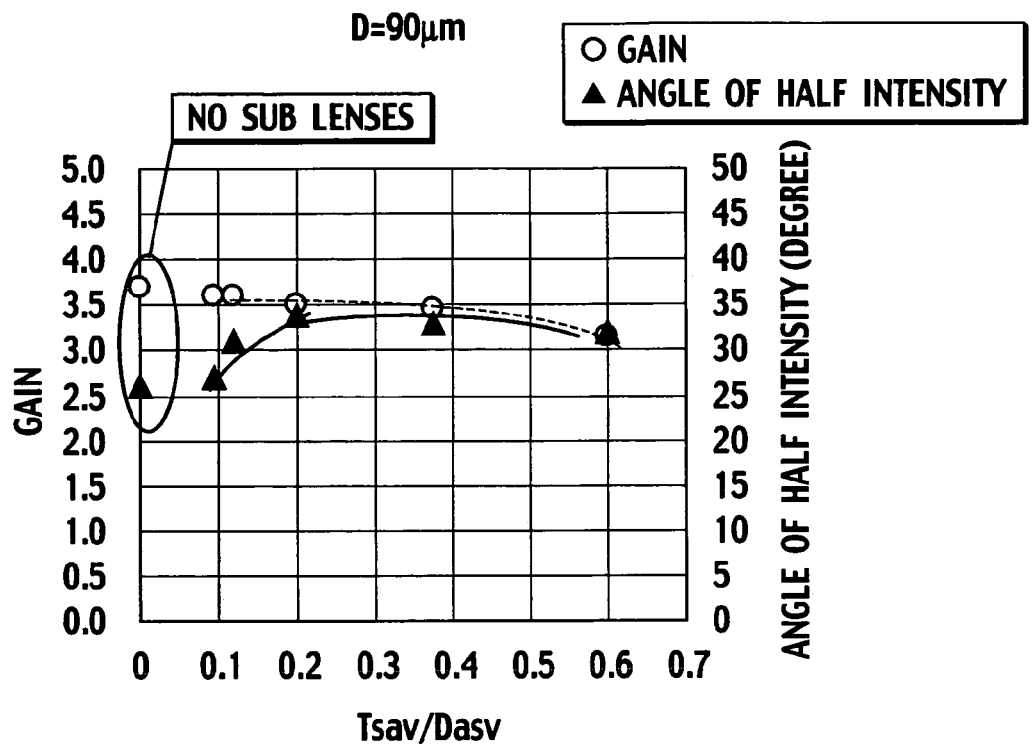
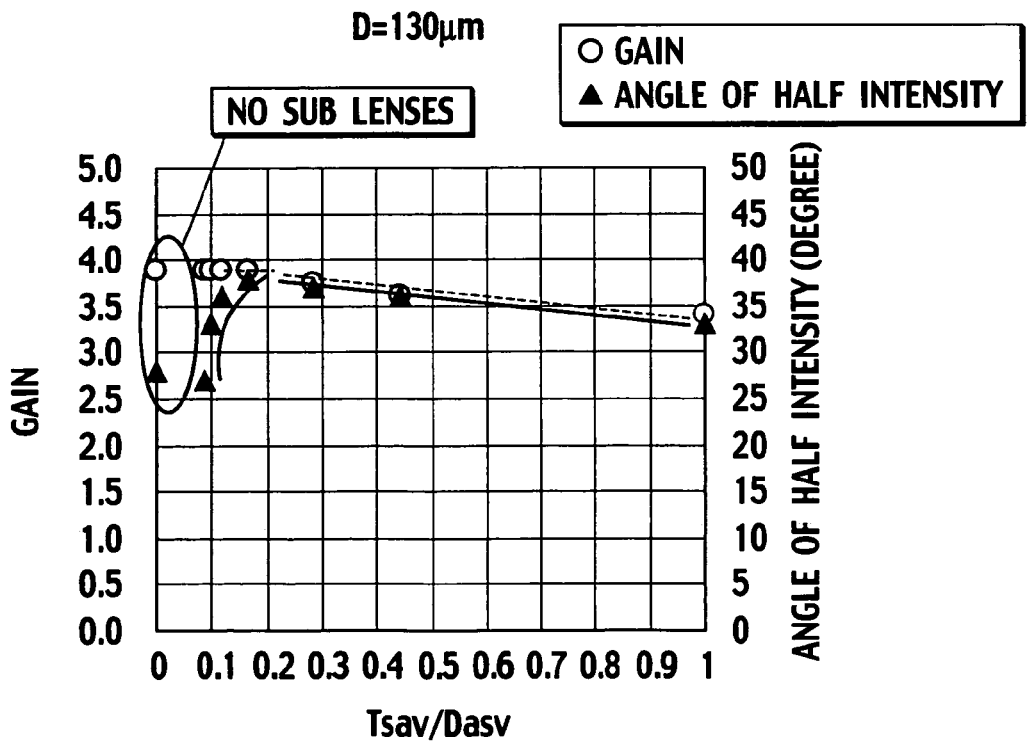

FIG.10A

| DRY FILM | | ETCHING AMOUNT $E=(P_x-A_x)/2$ | MICRO LENS SIZE D | SUB-LENS SIZE $D_{SAV}$ |
|---|---|---|---|---|
| OPENING PITCH $P_x$ | OPENING WIDTH $A_x$ | | | |
| 90 | 40 | 25 | 90 | 32 |
| 90 | 60 | 15 | 90 | 25 |
| 90 | 70 | 10 | 90 | 15 |
| 90 | 75 | 7.5 | 90 | 8 |
| 90 | 80 | 5 | 90 | 5 |

(UNIT: MICROMETER)

FIG.10B

| DRY FILM | | ETCHING AMOUNT $E=(P_x-A_x)/2$ | MICRO LENS SIZE D | SUB-LENS SIZE $D_{SAV}$ |
|---|---|---|---|---|
| OPENING PITCH $P_x$ | OPENING WIDTH $A_x$ | | | |
| 130 | 40 | 45 | 130 | 45 |
| 130 | 60 | 35 | 130 | 40 |
| 130 | 80 | 25 | 130 | 34 |
| 130 | 100 | 15 | 130 | 24 |
| 130 | 110 | 10 | 130 | 14 |
| 130 | 115 | 7.5 | 130 | 9 |
| 130 | 120 | 5 | 130 | 4 |

(UNIT: MICROMETER)

US 7,110,643 B2

MICRO LENS ARRAY AND A METHOD OF MANUFACTURING A REPLICATION MOLD FOR THE SAME

BACKGROUND OF THE INVENTION

1. Field of the Invention

This invention relates to a micro lens array in which a plural of a convexly protruded micro lenses are closely arranged in two dimensions and a plural of convex sub-lenses having a smaller curvature radius than that of the micro lenses are protrusively formed along the surface of each micro lens. The present invention also relates to a method of manufacturing a replication mold for the micro lens array.

2. Description of the Related Art

The micro lens array configured by arranging a plural of convexly protruded micro lenses closely in two dimensions is used for a liquid crystal display, an optical coupler element, an image input device, and the like.

Making use of optical anisotropy, orientation, fluidity and the like of a liquid crystal molecule, a liquid crystal display creates images using a liquid crystal cell on which an optical shutter is arranged the shutter being capable of changing an optical transparency or reflectivity thereof on application of voltage to the cell. The liquid crystal display is categorized into two types: a direct-view-type display in which images created by liquid crystal cells are directly observed; and a projection-type display in which images created on a screen by being projected from the front or the back are observed.

The above-mentioned direct-view-type display is some-what disadvantageous in that image quality changes with observation angles. In other words, while the display has the highest brightness when seen from the normal direction, the brightness becomes lower when the observation angle deviates from the normal direction. At worst, the display is unobservable when seen from a certain view angle or above. That is, this type of display has a disadvantage in that an appropriate angle of view is narrow.

In order to eliminate this disadvantage, there has been proposed a method of increasing an angle of view by combining a liquid crystal display and a micro lens array, in other words, a method of disposing in front of a liquid crystal cell a micro lens array configured by arranging a plural of micro lenses closely in two dimensions.

Also, there has been proposed a use of the micro lens array for a screen so as to expand the angle of view in the projection-type display in which images are created on a screen by being projected from the back.

An example of this type of micro lens array is a micro lens array configured by disposing a plural of micro lenses having a convex shape in a hexagonal close-packed (honeycomb) arrangement as disclosed in Japanese Patent Application Publication No. 2001-305315 (for example on page 7, FIG. 7).

In addition, as a method of manufacturing a replication mold for a micro lens array configured by arranging a plural of micro lenses in two dimensions, the method utilizing an etching or sandblasting technique, has been known, as disclosed in Japanese Patent Application Publication No. H10-62604 (pages 3–6, FIG. 1).

Furthermore, there have been disclosed a lenticular lens sheet having fine asperity on the surface of a lenticular lens device (see for example, Japanese Patent Publication No. 3,212,359 (pages 3–4, FIG. 1), a micro lens array having a compound spherical surface on which two or more types of fine convex-concave shapes are formed, and a method of manufacturing the same (see for example Japanese Patent Application Publication No. H07-63,904 (pages 3–4, FIG. 1)).

FIGS. 1A, 1B and 1C are a front view, a perspective view, and a bottom view of a related-art micro lens array element, respectively. FIGS. 2A to 2C are a process chart showing a related-art method of manufacturing an optical substrate (a replication mold for a micro lens array).

The related-art micro lens array element 100 shown in FIGS. 1A to 1C is disclosed by the above-mentioned Japanese Patent Application Publication No. 2001-305315. The micro lens array element 100 is explained briefly, referring to FIGS. 1A to 1C.

The related-art transparent micro lens array element 100 includes a lens substrate 101 manufactured using a transparent substrate such as a transparent resin substrate, a resin sheet, or the like, and a plural of micro lenses 102a projected in a shape of a near hemisphere, the micro lenses 102a being integrally arranged in two dimensions on an upper surface 101a of the lens substrate 101 as shown in FIGS. 1A to 1C.

When the plural of micro lens 102a constituting the micro lens array 102 are seen from a bottom face 101b of the lens substrate 101, they are arranged in a hexagonal close-packed (honeycomb) arrangement and thereby placed at the highest density.

On the bottom face 101b of the lens substrate 101, the micro lens array 102 has a light incidence portion (or light exiting portion) 103 in a position which is in agreement with an optical axis K of each micro lens 102a and a light shielding portion 104 which prevents light from passing therethrough in a position other than each light incidence portion (or light exiting portion) 103. Each light shielding portion 104 has a diffusion reflection film (or an anti-reflection film) 105 thereon. Japanese Patent Application Publication No. 2001-305315 states that images of high luminosity and high contrast in a large angle of view can be realized with this construction when the micro lens array element 100 is applied to a liquid crystal display, a rear projector equipment or the like.

Next, the method of manufacturing an optical substrate (a replication mold for a micro lens array) disclosed in Japanese Patent Application Publication No. H10-62604 will be explained briefly, referring to FIGS. 2A to 2C.

A method of manufacturing the optical substrate is actualized in two types depending on whether an etching or sandblasting technique is employed. Hereinafter, these methods are explained in this order.

Firstly, where etching is employed, a photoresist 202 is coated on an upper surface 201a of a glass substrate 201 as shown in FIG. 2A, and then made into a mask by photolithography. The mask has an opening for an alignment mark portion AM that is to form an alignment mark and an opening for a micro lens portion R that is to form a micro lens.

Next, as shown in FIG. 2B, using the photoresist 202 on the glass substrate 201 as the mask, the glass substrate 201 is etched so as to form the lens portion R and the alignment mark portion AM therein by wet etching with an HF etchant, or dry etching with carbon tetrachloride ($CCl_4$) gas.

While the photoresist 202 is removed in the lens portion R during the etching, the photoresist 202 remains in the alignment mark portion AM since the photoresist 202 is patterned so that the photoresist 202 is not removed in the alignment mark portion AM by etching, as shown in FIG. 2C. After the above procedures are carried out, the optical substrate (namely, a replication mold for a micro lens array)

201 that serves as a mold for manufacturing a micro lens array (not shown) is completed.

Although not illustrated, by filling a transparent resin having a high refractive index into the lens portion R and the alignment mark portion AM shown in FIG. 2C, a micro lens array is obtained.

On the other hand, when employing the sandblasting, a photosensitive dry film photoresist having a resistance to sandblasting is used as a photoresist 202. Then, an opening in this dry film is formed in a position in which the lens portion R should be formed and a position in which the alignment mark part AM should be formed by photolithography. Next, in the sandblasting, the glass substrate 201 is ground physically, thereby forming the lens portion R and the alignment mark portion AM. Then, the sandblasted surface of the glass substrate 201 in which the lens portion R and the alignment mark portion AM have been formed is slightly etched by wet etching with the HF etchant or dry etching with the $CCl_4$ gas, in order to make the surface flat and smooth. With the above procedures, the optical substrate (a replication mold for a micro lens array) 201 that serves as a mold for manufacturing a micro lens array (not shown) is completed.

Although the related-art micro lens array element 100 shown in FIGS. 1A to 1C is able to increase an angle of view when applied to a liquid crystal display, a rear projector or the like, a further increase in the angle of view has been desired.

In addition, when the etching is employed in the related-art method of manufacturing the replication mold as shown in FIGS. 2A to 2C, only a small change in a chemical composition or crystal structure of the substrate 201 may lead to a variation in etching characteristic. When this happens, a desired shape of the lens portion R and the alignment mark portion AM is no longer obtained. Moreover, when the optical substrate is not sufficiently cleaned immediately after the substrate is etched into a desired shape, it is difficult to maintain the desired shape of a replication mold having a fine lens structure because the remaining etchant may erode the substrate.

When the sandblasting is employed in the related-art method of manufacturing the replication mold, the photosensitive dry film photoresist 202 remains on the substrate after the sandblasting because the dry film photoresist 202 has a resistance to sandblasting, thereby leaving a distance between the adjacent two lens portions R. The distance cannot be eliminated even when etching is carried out in order to smoothen the sandblasted surface of the lens portion R and the alignment mark portion AM, thereby making it difficult to dispose a plural of lens portions R at the highest density.

A micro lens array that enables a further increase in the angle of view rather than the conventional micro lens array and a method of manufacturing a replication mold for such a micro lens array have been desired.

SUMMARY OF THE INVENTION

This invention has been made in view of the above-mentioned circumstances. A first aspect of the present invention provides a micro lens array in which a plural of convexly protruded micro lenses are closely arranged in two dimensions and a plural of convex sub-lenses having a smaller curvature radius than that of the micro lenses are protrusively formed along the surface of each micro lens. The micro lens array is configured so that $D_{sav}/D$ is in a range from 0.1 to 0.3, where D is a micro lens bottom face width obtained by halving the summation of the maximum and the minimum width which are measured along a line passing through the center of the bottom face of the micro lens when the bottom face of the micro lens is not circular, or is a micro lens bottom face diameter when the bottom face of the micro lens is circular; $D_s$ is a sub-lens bottom face width obtained by halving the summation of the maximum and the minimum width which are measured along a line passing through the center of the bottom face of the sub-lens when the bottom face of the sub-lens is not circular, or is a sub-lens bottom face diameter when the bottom face of the sub-lens is circular; and $D_{sav}$ is an average sub-lens bottom face width obtained by averaging a plural of the sub-lens bottom face widths $D_s$, or is an average sub-lens bottom face diameter obtained by averaging a plural of the sub-lens bottom face diameters $D_s$.

A second aspect of the invention provides another micro lens array in which a plural of convexly protruded micro lenses are closely arranged in two dimensions and a plural of convex sub-lenses having a smaller curvature radius than that of the micro lenses are protrusively formed on the surface of each micro lens. The micro lens array is configured so that $T_{sav}/D_{sav}$ is 0.1 or more, where $D_s$ is a sub-lens bottom face width obtained by halving the summation of the maximum and the minimum width which are measured along a line passing through the center of the bottom face of the sub-lens when the bottom face of the sub-lens is not circular, or is a sub-lens bottom face diameter when the bottom face of the sub-lens is circular; $D_{sav}$ is an average sub-lens bottom face width obtained by averaging a plural of the sub-lens bottom face widths $D_s$, or is an average sub-lens bottom face diameter obtained by averaging a plural of the sub-lens bottom face diameters $D_s$; $T_s$ is a sub-lens height; and $T_{sav}$ is an average height obtained by averaging a plural of the sub-lens heights Ts.

A third aspect of the present invention provides yet another micro lens array in which a plural of convexly protruded micro lenses are closely arranged in two dimensions and a plural of convex sub-lenses having a smaller curvature radius than that of the micro lenses are protrusively formed on the surface of each micro lens. The micro lens array is configured so that $D_{sav}/D$ is in a range from 0.1 to 0.3 and also $T_{sav}/D_{sav}$ is 0.1 or more, where $D_s$ is a sub-lens bottom face width obtained by halving the summation of the maximum and the minimum width which are measured along a line passing through the center of the bottom face of the sub-lens when the bottom face of the sub-lens is not circular, or is a sub-lens bottom face diameter when the bottom face of the sub-lens is circular; $D_{sav}$ is an average sub-lens bottom face width obtained by averaging a plural of the sub-lens bottom face widths $D_s$, or is an average sub-lens bottom face diameter obtained by averaging a plural of the sub-lens bottom face diameters $D_s$; $T_s$ is a sub-lens height; and $T_{sav}$ is an average height obtained by averaging a plural of the sub-lens heights $T_s$.

A fourth aspect of the present invention provides a method of manufacturing a replication mold for a micro lens array in which a plural of convexly protruded micro lenses are closely arranged in two dimensions and a plural of convex sub-lenses having a smaller curvature radius than that of the micro lenses are protrusively formed on the surface of the micro lens. The method comprises steps of forming an opening in a mask material at a predetermined spacing and width while covering an area between the openings with a mask portion after providing a mask material having a resistance to blasting on an upper surface of a substrate; forming by blasting fine powder blast abrasive towards the mask material a first concave portion for the micro lens in the exposed portion of the substrate so that the first concave portion has a predetermined depth, and an initial nucleus to be grown into a second concave portion for a sub-lens portion along the inner surface of the micro lens; removing the mask material formed on the upper surface of the substrate, and etching the substrate to cause a periphery of adjacent first concave portions for the micro lens to contact with each other and to form a plural of the second concave portions for the sub-lenses in the first concave portion.

A fifth aspect of the present invention provides a method of manufacturing a replication mold for a micro lens array in which a plural of convexly protruded micro lenses are closely arranged in two dimensions. The method comprises steps of forming an opening in a mask material at a predetermined spacing and width while covering an area between the openings with a mask portion after providing a mask material having a resistance to blasting on an upper surface of a substrate; forming by blasting fine powder blast abrasive towards the mask material a concave portion for the micro lens in the exposed portion of the substrate so that the first concave portion has a predetermined depth; removing the mask material formed on the upper surface of the substrate; and etching the substrate to cause the periphery of adjacent concave portions for the micro lenses to contact with each other while smoothening the surface of the concave portion for the micro lens.

According to the micro lens array of the first aspect, there is obtained a micro lens array having a large angle of view since $D_{sav}/D$ is in a range from 0.1 to 0.3 when a plural of convexly protruded micro lens are closely arranged in two dimensions and a plural of convex sub-lenses having a curvature radius smaller than that of the micro lens are protrusively formed on the surface of each micro lens, where D is the micro lens bottom face width obtained by halving the summation of the maximum and the minimum width which are measured along the line passing through the center of the bottom face of the micro lens when the bottom face of the micro lens is not circular, or is the micro lens bottom face diameter when the bottom face of the micro lens is circular; $D_s$ is the sub-lens bottom face width obtained by halving the summation of the maximum and the minimum width which are measured along the line passing through the center of the bottom face of the sub-lens when the bottom face of the sub-lens is not circular, or is the sub-lens bottom face diameter when the bottom face of the sub-lens is circular; and $D_{sav}$ is the average sub-lens bottom face width obtained by averaging a plural of the sub-lens bottom face widths $D_s$, or is the average sub-lens bottom face diameter obtained by averaging a plural of the sub-lens bottom face diameters $D_s$. According to this micro lens array, images of high luminosity and high contrast can be realized in a large angle of view when the micro lens array is applied to a liquid crystal display, a rear projector, a screen for a rear projector and the like.

Moreover, according to the micro lens array of the second aspect, there is obtained a micro lens array having a large angle of view since $T_{sav}/D_{sav}$ is 0.1 or more when a plural of convexly protruded micro lens are closely arranged in two dimensions and a plural of convex sub-lenses having a curvature radius smaller than that of this micro lens are protrusively formed on the surface of each micro lens, where $D_s$ is the sub-lens bottom face width obtained by halving the summation of the maximum and the minimum width which are measured along the line passing through the center of the bottom face of the sub-lens when the bottom face of the sub-lens is not circular, or is a sub-lens bottom face diameter when the bottom face of the sub-lens is circular; $D_{sav}$ is the average sub-lens bottom face width obtained by averaging a plural of the sub-lens bottom face widths $D_s$, or is the average sub-lens bottom face diameter obtained by averaging a plural of the sub-lens bottom face diameters $D_s$; $T_s$ is the height of the sub-lens; and $T_{sav}$ is the average height obtained by averaging a plural of the sub-lens heights $T_s$. According to this micro lens array, images of high luminosity and high contrast can be realized in a large angle of view when the micro lens array is applied to a liquid crystal display, a rear projector, a screen for a rear projector and the like.

Furthermore, according to the micro lens array of the third aspect, there is obtained a micro lens array having a large angle of view since $D_{sav}/D$ is in a range from 0.1 to 0.3 and also $T_{sav}/D_{sav}$ is 0.1 or more are satisfied when a plural of convexly protruded micro lens are closely arranged in two dimensions and a plural of convex sub-lenses having a curvature radius smaller than that of this micro lens are protrusively formed on the surface of each micro lens, where D is the micro lens bottom face width obtained by halving the summation of the maximum and the minimum width which are measured along the line passing through the center of the bottom face of the micro lens when the bottom face of the micro lens is not circular, or is the micro lens bottom face diameter when the bottom face of the micro lens is circular; $D_s$ is the sub-lens bottom face width obtained by halving the summation of the maximum and the minimum width which are measured along the line passing through the center of the bottom face of the sub-lens when the bottom face of the sub-lens is not circular, or is the sub-lens bottom face diameter when the bottom face of the sub-lens is circular; $D_{sav}$ is the average sub-lens bottom face width obtained by averaging a plural of the sub-lens bottom face widths $D_s$, or is the average sub-lens bottom face diameter obtained by averaging a plural of the sub-lens bottom face diameters $D_s$; $T_s$ is the height of the sub-lens; and $T_{sav}$ is the average height obtained by averaging a plural of the sub-lens heights $T_s$. According to this micro lens array, images of high luminosity and high contrast can be realized in a large angle of view when the micro lens array is applied to a liquid crystal display, a rear projector, a screen for a rear projector and the like.

According to the method of manufacturing a replication mold for a micro lens array of the fourth aspect, since blast-grinding and etching are co-employed to closely form a plural of concave portions on the upper surface of the substrate and to form a plural of hollows for sub-lenses along the inner surface of each concave portion for a micro lens, the replication mold for manufacturing a micro lens array in which a plural of sub-lenses are protrusively formed on the surface of each micro lens is obtained conveniently and less costly. Moreover, since blast-grinding and etching are co-employed, the replication mold for a micro lens array is obtained at shorter times.

Moreover, according to the method of manufacturing a replication mold for a micro lens array of the fifth aspect, since blast-grinding and etching are co-employed to closely form a plural of concave portions on the upper surface side of the substrate and further etching is carried out to smooth out a plural of hollows for sub-lenses that have once been formed along the inner surface of each concave portion for a micro lens, the replication mold for manufacturing a micro lens array in which each micro lens does not have any sub-lenses on the inner surface thereof is obtained conveniently and less costly. Moreover, since blast-grinding and etching are co-employed, the replication mold for a micro lens array is obtained at shorter times.

BRIEF DESCRIPTION OF THE DRAWINGS

In the accompanying drawings:

FIGS. 7A and 7B illustrate a dependence of a view angle of half intensity and gain on a ratio of $T_{sav}/D_{sav}$.

FIGS. 10A and 10B are a measurement result obtained from various micro lens arrays having a respectively different $D_{sav}$.

DESCRIPTION OF THE PREFERRED EMBODIMENTS

Referring to accompanying drawings, a micro lens array and a method of manufacturing a replication mold for the micro lens array according to the present invention will be explained hereafter.

A First Embodiment

Figure 3A:
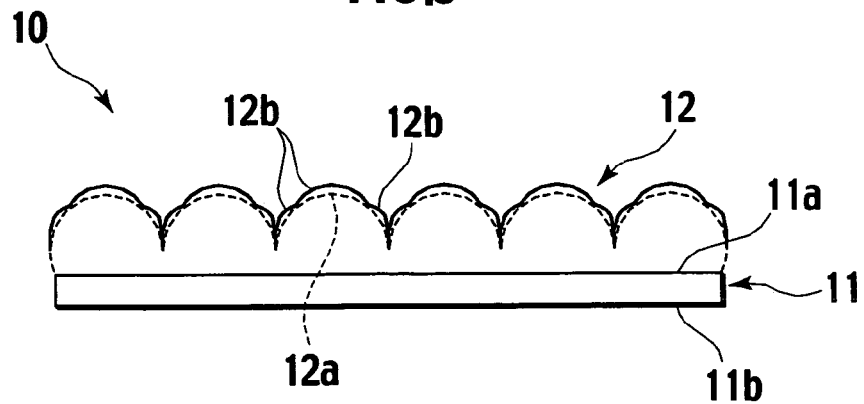
FIGS. 3A, 3B, and 3C are a front view, a perspective view and a bottom view of a micro lens array according to a first embodiment of the present invention, respectively.
Figure 3B:
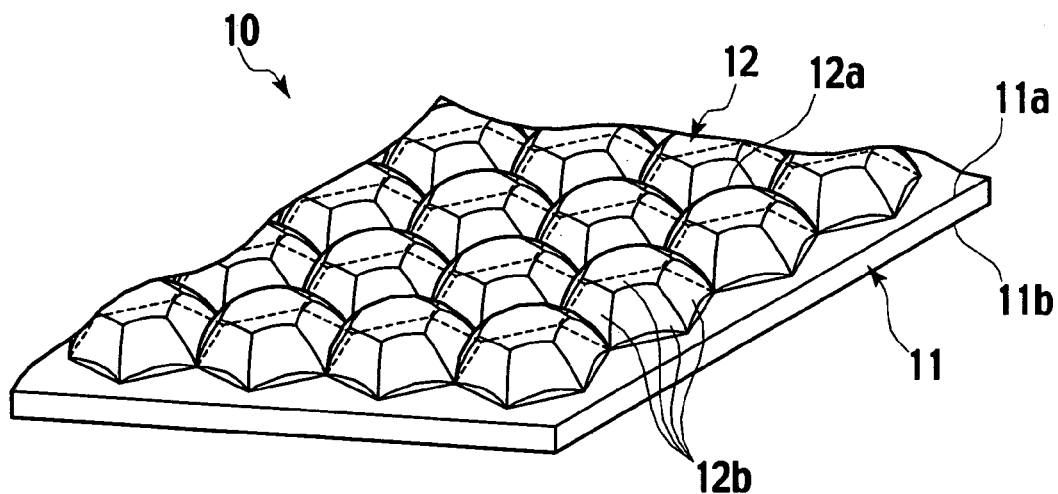
Figure 3C:
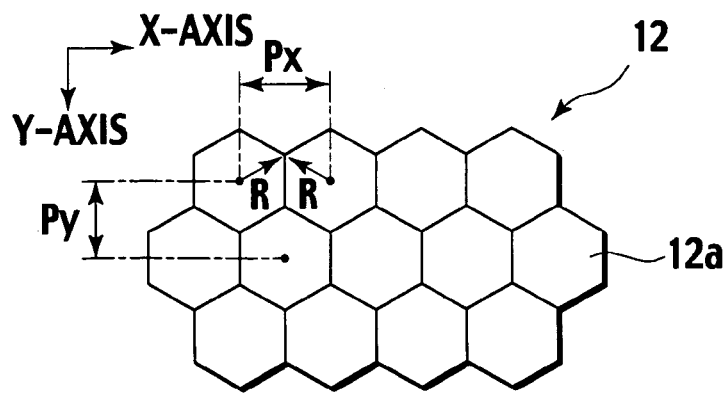
Figure 4:
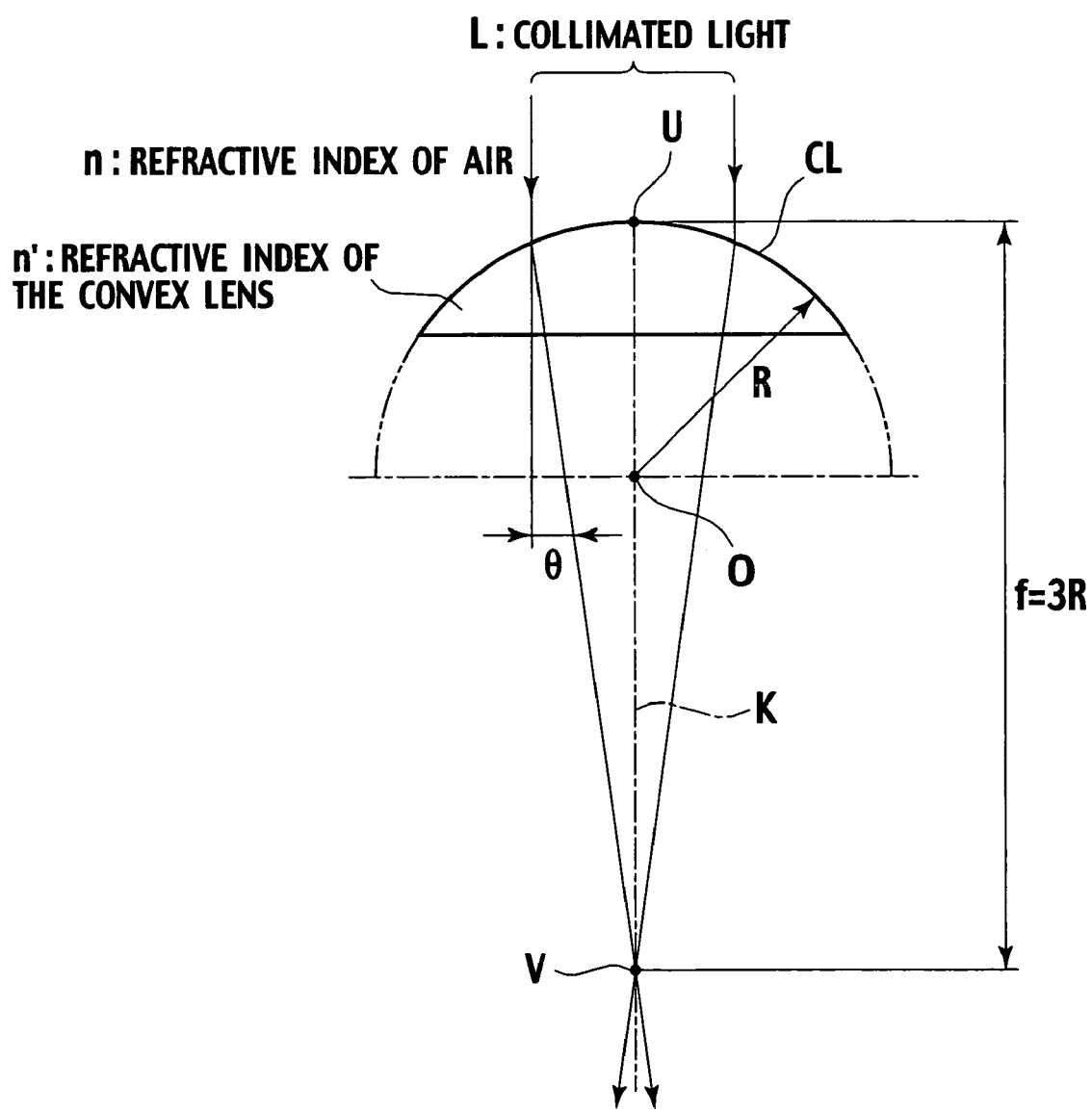
FIG. 4 is an explanatory drawing for generally explaining a focal length f of the convex lens having a curvature radius R.
Figure 5:
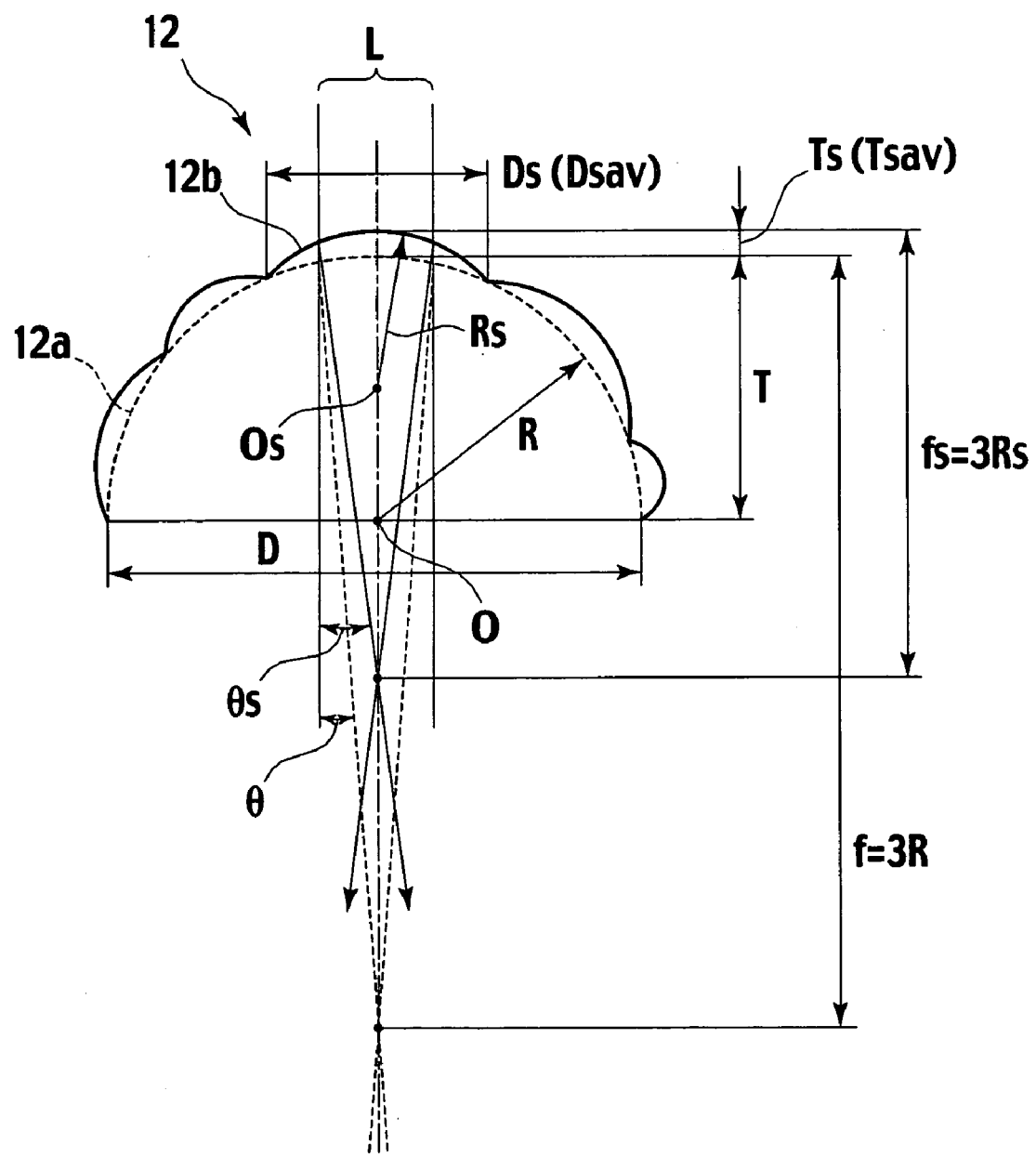
FIG. 5 is an enlarged view of one of micro lenses constituting the micro lens array shown in FIGS. 3A to 3C.

FIGS. 3A, 3B, and 3C are a front view, a perspective view and a bottom view of a micro lens array according to a first embodiment of the present invention, respectively. FIG. 4 is an explanatory drawing for generally explaining a focal length f of the convex lens having a curvature radius R. FIG. 5 is an enlarged view of one of micro lenses constituting the micro lens array shown in FIGS. 3A to 3C.

As shown in FIGS. 3A to 3C, a micro lens array 12 according to the first embodiment of the present invention is composed of a lens substrate 11 having an optical transparency and a micro lens array formed integrally on an upper surface 11a of the lens substrate 11. The micro lens array 12 is formed of an optically transparent material and the lens substrate 11 has substantially the same optical transparency as this material.

More specifically, the lens substrate 11 serving as a base material for a micro lens array element 10 is formed of a resin substrate having an optical transparency, a transparent glass substrate made of a resin sheet, or the like. The upper and bottom face 11a, 11b of the lens substrate 11 are two dimensionally flat.

In addition, the micro array lens 12 is formed integrally on the upper surface 11a of the optically transparent lens substrate 11 using a transparent resin that allows light to transmit therethrough.

By the way, while the micro lens array element 10 comprised of the lens substrate 11 and the micro lens array 12 will be described hereinafter, only the micro lens array 12 can be formed into substantially the same configuration as stated above using a transparent resin material.

The above-mentioned micro lens array 12 is configured in a way that a plural of convexly protruded micro lens 12a are arranged in two dimensions on the upper surface 11a of the lens substrate 11. In addition, a plural of convex sub-lenses 12b having a smaller radius curvature than that of each micro lens 12a are formed protrusively and integrally along the surface of each micro lens 12a.

By the way, the plural of sub-lenses 12b formed protrusively and integrally along the surface of the micro lens 12a may be referred to as a cluster lens.

Moreover, the plural of sub-lenses 12b formed protrusively and integrally along the surface of one micro lens 12a in the micro lens array 12 have a smaller bottom face area and a lower height than the one micro lens 12a does.

In this embodiment, for convenience of explanation, the convexly protruded micro lenses 12a formed on the surface 11a of the lens substrate 11 are formed into a near hemisphere. In addition, while the bottom face of the micro lens 12a may have a various shape including a circular, an ellipsoid, a polygon, or the like. The micro lens 12a having a substantially hexagonal-shaped bottom face is explained in this embodiment.

Figure 1A:
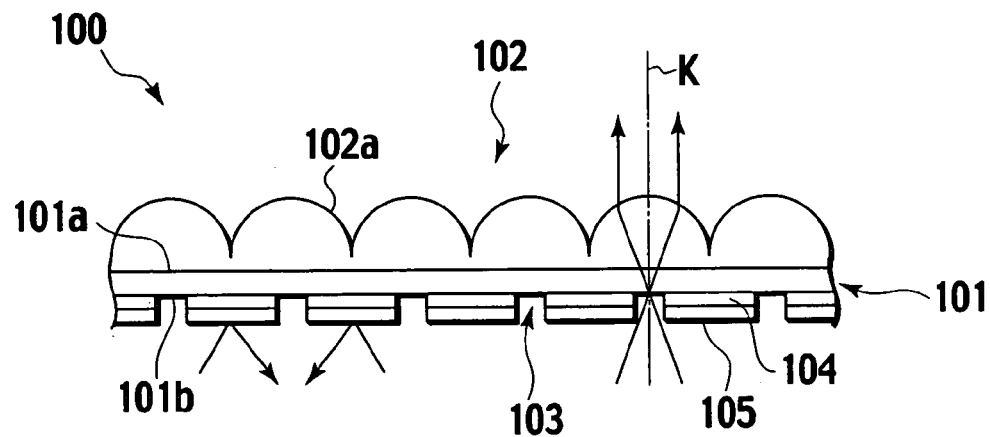
FIGS. 1A, 1B and 1C are a front view, a perspective view, and a bottom view of a related-art micro lens array element, respectively.
Figure 1B:
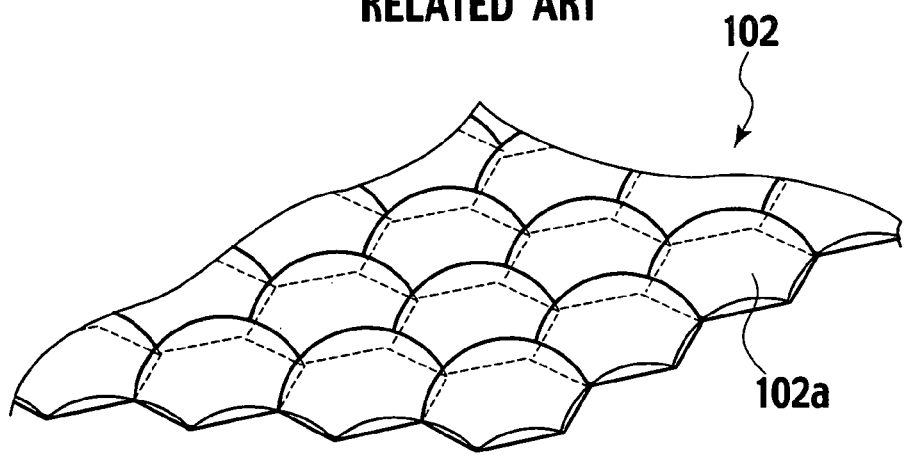
Figure 1C:
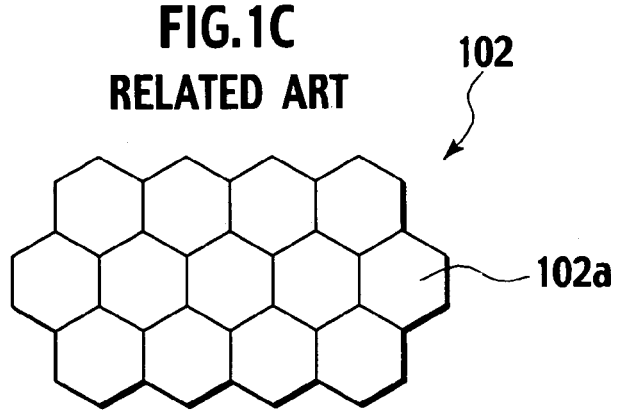
Figure 2A:
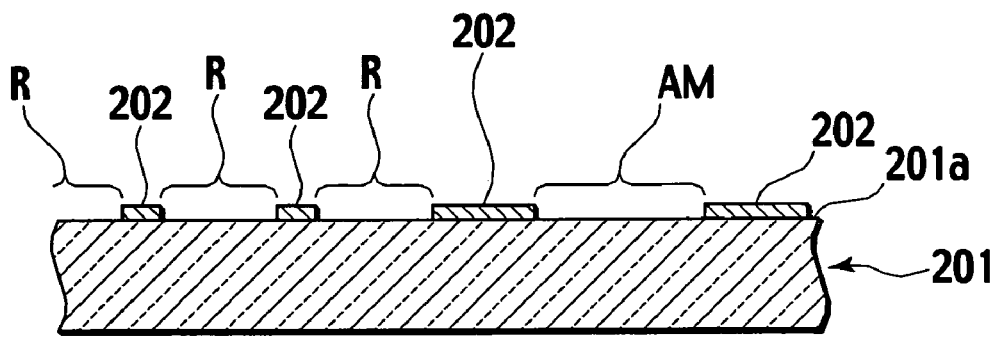
FIGS. 2A to 2C are a process chart showing a related-art method of manufacturing an optical substrate (a replication mold for a micro lens array).
Figure 2B:
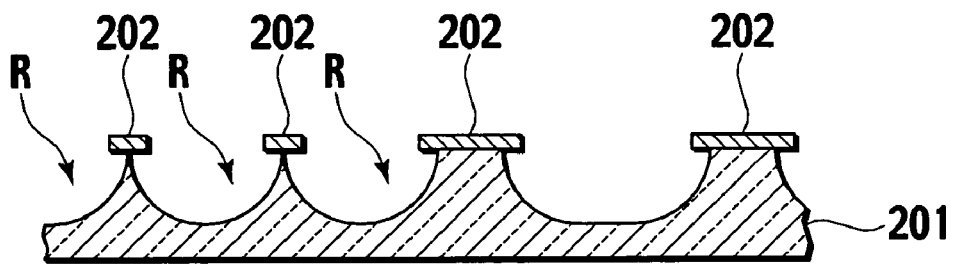
Figure 2C:
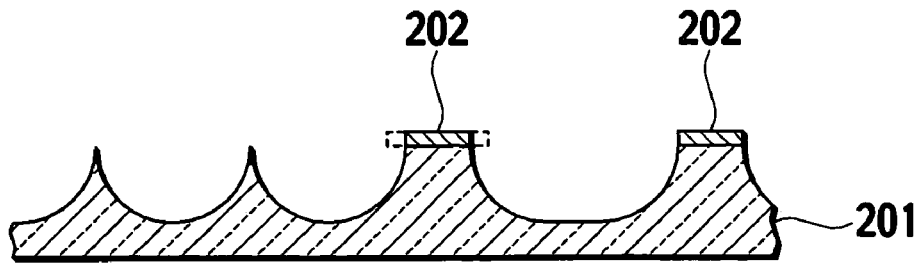

When each micro lens 12a among the micro lens array 12 is protruded into a near hemisphere shape having a radius curvature R, for example, the plural of micro lenses 12a are disposed in a hexagonal close-packed (honeycomb) arrangement in order to arrange the micro lenses 12a at the highest density when seen from the bottom face 11b of the lens substrate 11. When the plural of micro lenses 12a are disposed in a hexagonal close-packed (honeycomb) arrangement, a pitch Px along the X-axis in FIG. 1C is given as 2R cos 30 degree. Also, a pitch Py along the Y-axis in FIG. 1C is given as R+R sin 30 degree, because another micro lens 12a is placed along the X-axis between the adjacent two micro lenses 12a disposed along the X-axis. When seen from the bottom of the micro lenses 12a protruded into substantially a near hemisphere, they are arranged with no space between.

By the way, while the plural of micro lenses 12a are provided in the micro lens array 12 in a way that they are disposed in a hexagonal close-packed (honeycomb) arrangement, the micro lens array 12 can be obtained by disposing the micro lenses 12a into another polygonal arrangement instead.

In addition, the micro lens array 12 can be obtained by disposing the plural of micro lenses 12a having a circular bottom of a diameter 2R in a circular arrangement at the highest density. In this highest density arrangement, since the plural of micro lenses 12a come into a contact with the adjacent micro lenses 12a at its circumference (not shown), leaving a little space between the adjacent micro lenses, the density at which the plural of micro lenses 12 are packed becomes lower than the density at which they are packed hexagonally. However, the pitch Px along the X-axis is 2R and the pitch Py along the Y-axis is 2R sin 60 degree, because another micro lens 12a is disposed along the X-axis between the adjacent two micro lenses 12a disposed along the Y-axis. In this case, the micro lenses 12a protruded in a shape of substantially a hemisphere are closely packed with only a little space between.

Here, it is assumed that a commonly used convex lens CL having a curvature radius R is formed with its center on a central point O; this convex lens CL is used in the atmosphere; and the refractive index of the convex lens CL is n', as shown in FIG. 4. When collimated light L is incident upon the convex lens CL and converges at a point V on an optical axis K, a focal length f is given as the distance between an apex U of the convex lens CL and the point V on the optical axis K of the convex lens CL. The focal length f is expressed as:

$$f = n'R/(n'-n). \quad (1)$$

Here, n is a refraction index of air (=1); and n' is a refraction index of a glass material (=1.5) when a glass material is used for the convex lens CL. When the values of n and n' are substituted into the equation (1), the focal length f of the convex lens CL is obtained as 3R.

From the above discussion, the smaller the radius curvature becomes, the shorter the focal length becomes, thereby increasing an angle θ (theta) at which the light is refracted by the convex lens CL. As a result, an angle of view is increased.

As shown in FIG. 5, when one micro lens 12a in the micro lens array 12 is protruded into a near hemisphere shape having a radius curvature R and a height T with is center on the central point O, a radius curvature $R_s$ of the sub-lens 12b protruded in a shape of a near hemisphere with its center on the central point Os is smaller than that of the micro lens 12a, supposing that a height $T_s$ of the convex sub-lens 12b formed along the surface of the micro lens 12a is set so that $T_s$ is in a range from T/10 to T/2, for example.

From the principle explained with reference to FIG. 4, the focal length f of one micro lens 12a is 3R and the focal length $f_s$ of the sub-lens 12b is $3R_s$, thereby satisfying the relation: $f=3R>f_s=3R_s$. Also, a relation between the θ (theta) and θs (theta s) at which light is refracted by the micro lens 12a and by the sub-lens 12b, respectively is θ (theta)<θs (theta s).

Accordingly, the micro lens 12a having sub-lenses 12b formed along the surface thereof is able to provide a larger angle of view than that having no sub-lenses. As a result, the micro lens array 12 having a larger angle of view is realized when such a micro lens 12a is applied thereto.

Although the sub-lens 12b as well as the micro lens 12a has to be formed into substantially a convex shape for the purpose of increasing an angle of view, all the sub-lenses 12 protruded along the surface of each micro lens 12a do not necessarily have the same shape. Also the sub-lenses 12b may have not a near hemisphere but an aspheric shape.

When the micro lens array 12 is made using a micro lens array replication mold 21 (FIG. 9) according to the first embodiment of the present invention (described later), while the plural of sub-lenses 12b protrusively formed along the surface of each micro lens 12a have a smaller bottom face area than the micro lens 12a does, the plural of the sub-lenses 12b tend to be formed so as to have a respectively different bottom face area from another.

Here, the bottom face of the micro lens 12a is a virtual surface defined by borderlines between one micro lens 12a and a plural of its adjacent micro lenses in FIG. 3A. In addition, the bottom face of the sub-lens 12b is a virtual surface defined by borderlines between one sub-lens 12b and a plural of its adjacent sub-lenses 12b in FIG. 5. However, as shown in FIG. 5, when the bottom face of the micro lens 12a is not flat but curved, the bottom face of the micro lens 12a is an apparent surface of the micro lens 12a when seen from the central point O of the radius curvature to the apex of the micro lens 12a. Also, when the bottom face of the sub-lens 12b is not flat but curved, the bottom face of the sub-lens 12b is an apparent surface of the sub-lens 12b when seen from the central point $O_s$ of the radius curvature to the apex of the sub-lens 12b.

In addition, a design condition that realizes a large angle of view is determined by a ratio of $D_{sav}/D$, where D is the micro lens 12a bottom face width obtained by halving the summation of the maximum and the minimum width which are measured along a line passing through the center of the bottom face of the micro lens 12a when the bottom face of the micro lens 12a is not circular, or is a micro lens 12a bottom face diameter when the bottom face of the micro lens 12a is circular; $D_s$ is a sub-lens 12b bottom face width obtained by halving the summation of the maximum and the minimum width which are measured along a line passing through the center of the bottom face of the sub-lens 12b when the bottom face of the sub-lens 12b is not circular, or is a sub-lens 12b bottom face diameter when the bottom face of the sub-lens 12b is circular; and $D_{sav}$ is an average sub-lens 12b bottom face width obtained by averaging a plural of the sub-lens 12b bottom face widths $D_s$, or is an average sub-lens 12b bottom face diameter obtained by averaging a plural of the sub-lens 12b bottom face diameters $D_s$, taking account of various bottom face shapes such as circular, an ellipsoid, a polygon or the like when easily obtaining a relation between a bottom face area of one micro lens 12a and a bottom face area of one sub-lens 12b.

By the way, the line mentioned above is a virtual straight line drawn so as to pass through the center of the bottom face of the micro lens 12a (or sub-lens 12b) and to be along the bottom face of the micro lens 12a (or sub-lens 12b).

A dependence of a view angle of half intensity and gain on a ratio of $D_{sav}/D$ will be explained with reference to FIGS. 6A and 6B.

Figure 6A:
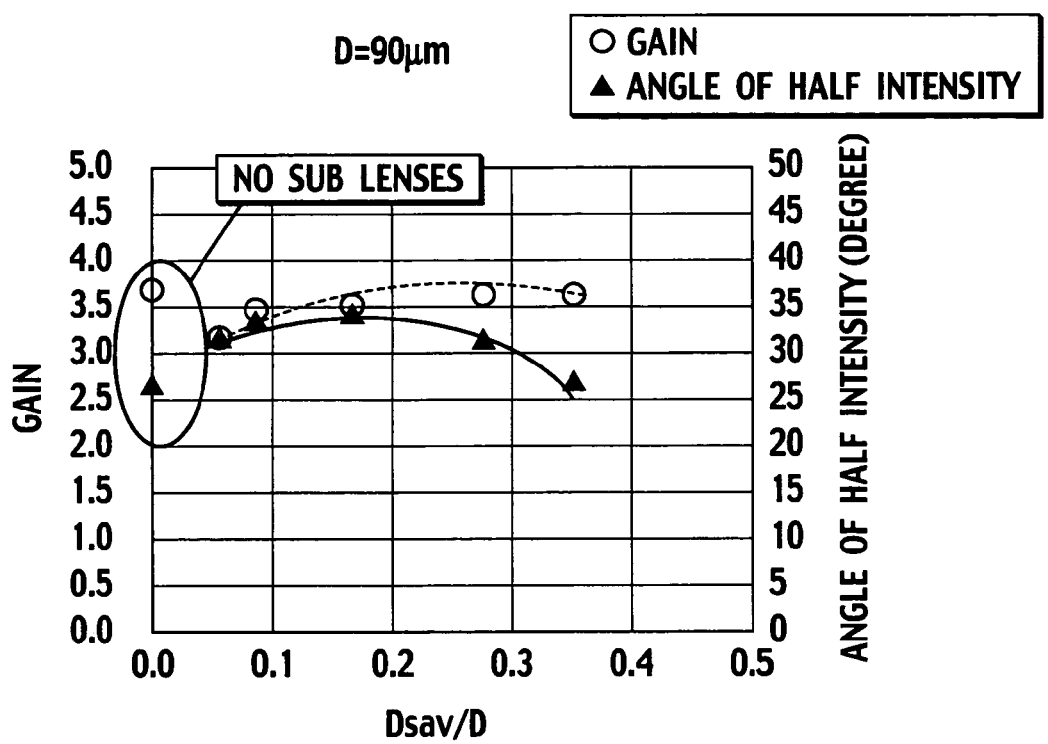
FIGS. 6A and 6B illustrate a dependence of a view angle of half intensity and gain on a ratio of $D_{sav}/D$.
Figure 6B:
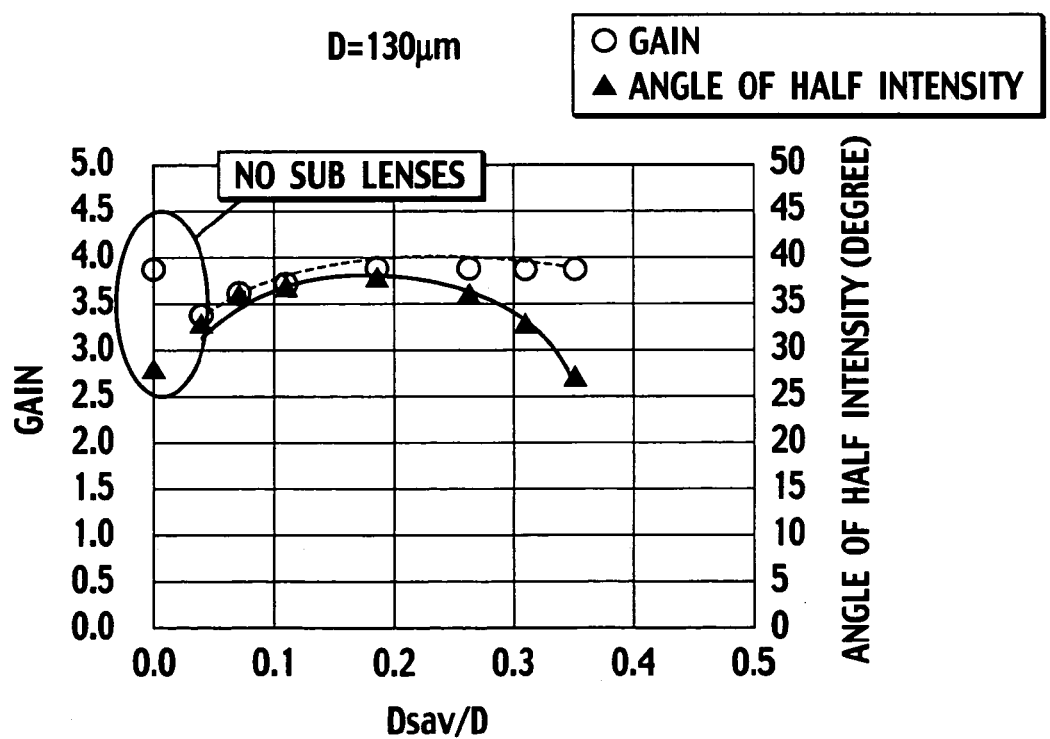

FIGS. 6A and 6B illustrate a dependence of a view angle of half intensity and gain on a ratio of $D_{sav}/D$. FIG. 6A illustrates the dependence when the bottom face width (or the bottom face diameter) D of the micro lens 12a is 90 micrometers and the average height $T_{sav}$ of the height $T_s$ of the sub-lens 12b protrusively formed along the surface of the micro lens 12a is 3 micrometers. FIG. 6B illustrates the dependence when the bottom face width (or the bottom face diameter) D of the micro lens 12a is 130 micrometers and the average height $T_{sav}$ of the height $T_s$ of the sub-lens 12b protrusively formed along the surface of the micro lens 12a is 4 micrometers.

The bottom face width (or the bottom face diameter) D of the micro lens and the bottom face width (or the bottom face diameter) $D_s$ of the sub-lens are measured with a laser microscope VK-8500 (KEYENCE). The gain and the view angle of half intensity are measured with a goniophotometer GP-200 (Murakami Color Research Laboratory Tokyo).

By the way, the above-mentioned gain value is obtained as a value relative to the gain of 1.0 obtained for a perfectly diffusing board. The above-mentioned view angle of half intensity is an angle at which the gain becomes half of the peak gain value.

As shown in FIGS. 6A and 6B, as apparent from a change in the gain and view angle of half intensity with respect to $D_{sav}/D$, the gain obtained for the micro lens having the sub-lenses 12b is almost the same as or slightly lower than that obtained for the micro lens having no sub-lenses 12b. However, such a difference places no significant impact on a practical use of the micro lens array. On the other hand, the view angle of half intensity in the micro lens having the sub-lenses 12b is higher than that in the micro lens having no sub-lenses when $D_{sav}/D$ is more than 0.1 (inclusive) and less than 0.3 (inclusive), thereby realizing the micro lens array 12 having a wider view angle.

Moreover, a larger angle of view is realized depending on a ratio of $T_{sav}/D_{sav}$ when $D_{sav}$ is defined as an average sub-lens bottom face width obtained by averaging the sub-lens bottom face width $D_s$ of each of the plural of sub-lenses 12b formed along the surface of the micro lens 12a or an average sub-lens bottom face diameter obtained by averaging the sub-lens bottom face diameter of each of the plural of sub-lenses 12b, and $T_{sav}$ is defined as an average height obtained by averaging the height $T_s$ of each of the plural of sub-lenses 12b.

A dependence of a view angle of half intensity and gain on a ratio of $T_{sav}/D_{sav}$ will be explained with reference to FIGS. 7A and 7B.

FIGS. 7A and 7B illustrate a dependence of a view angle of half intensity and gain on a ratio of $T_{sav}/D_{sav}$. FIG. 7A illustrates the dependence when the bottom face width (or the bottom face diameter) D of the micro lens is 90 micrometers and the average height $T_{sav}$ of the height $T_s$ of the sub-lens 12b protrusively formed along the surface of the micro lens 12a is 3 micrometers. FIG. 7B illustrates the dependence when the bottom face width (or the bottom face diameter) D of the micro lens is 130 micrometers and the average height $T_{sav}$ of the height $T_s$ of the sub-lens 12b protrusively formed along the surface of the micro lens 12a is 4 micrometers.

The bottom face width (or the bottom face diameter) $D_s$ of the sub-lens and the height $T_s$ of the plural of the sub-lens 12b are measured with a laser microscope VK-8500 (KEYENCE). The gain and the view angle of half intensity are measured with a goniophotometer GP-200 (Murakami Color Research Laboratory Tokyo).

By the way, the above-mentioned gain value is obtained as a value relative to the gain of 1.0 obtained for a perfectly diffusing board. The above-mentioned view angle of half intensity is an angle at which the gain becomes half of the peak gain value.

As shown in FIG. 7A and 7B, as apparent from a change in the gain and view angle of half intensity with respect to $T_{sav}/D_{sav}$, the gain obtained for the micro lens having the sub-lenses 12b is almost the same as or slightly lower than that obtained for the micro lens having no sub-lenses 12b. However, such a difference places no significant impact on a practical use of the micro lens array. On the other hand, the view angle of half intensity in the micro lens having the sub-lenses 12b is higher than that in the micro lens having no sub-lenses when $T_{sav}/D_{sav}$ is 0.1 or more, thereby realizing the micro lens array 12 having a larger angle of view.

Furthermore, while FIGS. 6A, 6B and FIGS. 7A, 7B illustrate a micro lens in which $D_{sav}/D$ is in a range from 0.1 to 0.3, and $T_{sav}/D_{sav}$ is 0.1 or more, respectively, it is apparent that the micro lens array 12 having much larger view angle of half intensity is obtained when both relations are satisfied.

Next, a method of manufacturing a micro lens array replication mold for the micro lens array 12 (FIGS. 3 and 5) according to the first embodiment of the present invention will be described with reference to FIGS. 8A to 8I.

In this embodiment, a method of manufacturing a micro lens replication mold for a micro lens array 12 (FIGS. 3 and 5) in which a plural of micro lenses 12a (FIGS. 3 and 5) protruded in a shape of a near hemisphere having a radius curvature of R, for example, are disposed two-dimensionally in a hexagonal close-packed (honeycomb) arrangement, and a plural of convex sub-lenses 12b having a smaller radius curvature than the micro lens 12a are formed protrusively along the surface of each micro lens 12a. However, a method of manufacturing a micro lens replication mold for a micro lens in which the bottom face of the micro lens 12a can have a various shape including a circular, an ellipsoid, and a polygon is also realized, for example.

FIGS. 8A to 8I are a schematic view illustrating a method of manufacturing a replication mold for a micro lens according to the first embodiment.

In the method of manufacturing a replication mold according to the first embodiment of the present invention, firstly, a substrate 21 is prepared as a base material for a replication mold for a micro lens according to the first embodiment. In this case, the substrate 21 is preferably formed of a glass or a ceramic substrate that is easily ground in a blast-grinding process described hereinafter. The substrate 21 has a flat upper surface 21a.

Figure 8A:
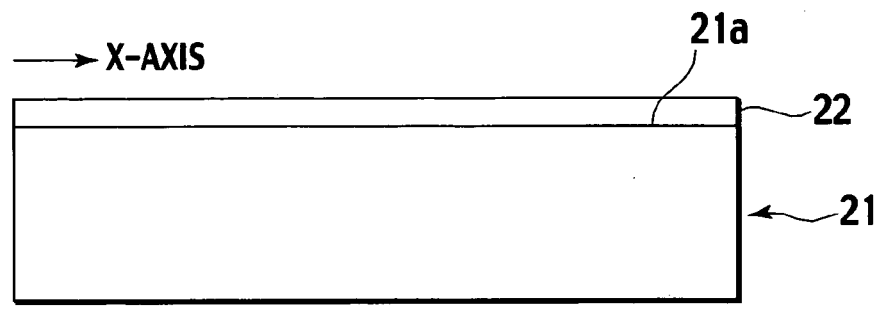
FIGS. 8A to 8I are a schematic view illustrating a method of manufacturing a replication mold for a micro lens according to the first embodiment.

In a photosensitive film attaching process illustrated in FIG. 8A, a photosensitive film 22 (referred to a dry film hereinafter) made by forming an ultra violet light hardening (UV-hardening) resin into a shape of film is pressed onto the upper surface 21a of the substrate 21 and heated to be attached thereon. The dry film is a mask material having a resistance to fine powder blast abrasive 28 (FIG. 8E) used in a blast-grinding process described hereinafter.

The method will hereinafter be explained while illustrating the two-dimensional substrate 21 seen from the direction of the X-axis.

Figure 8B:
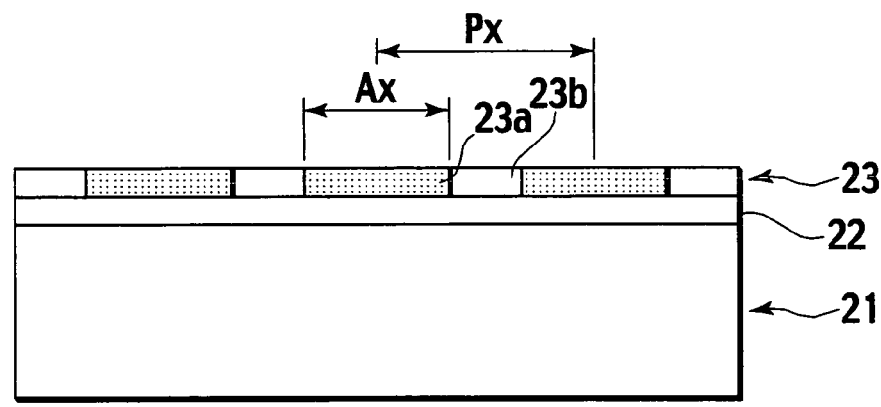

Next, in a negative mask placing process illustrated in FIG. 8B, a negative mask 23 that has alternatively a black portion 23a for blocking light and a transparent portion 23b for allowing light to pass therethrough is placed on the dry film 22.

The black portion 23a of the negative mask 23 is arranged in a position where a concave for forming the micro lens 12a (FIG. 3 and 5) having a radius curvature R that constitutes the micro lens array 12 (FIG. 3 and 5) has to be made in the substrate 21. A pitch Px of the black portions 23a along the X-axis is set to be 2R cos 30 degree as mentioned above. A width Ax along the X-axis is set to be smaller than the pitch Px. On the other hand, the transparent portion 23b of the negative mask 23 is formed between adjacent two black portions 23a. The transparent portion 23b has a width of (Px–Ax).

Figure 8C:
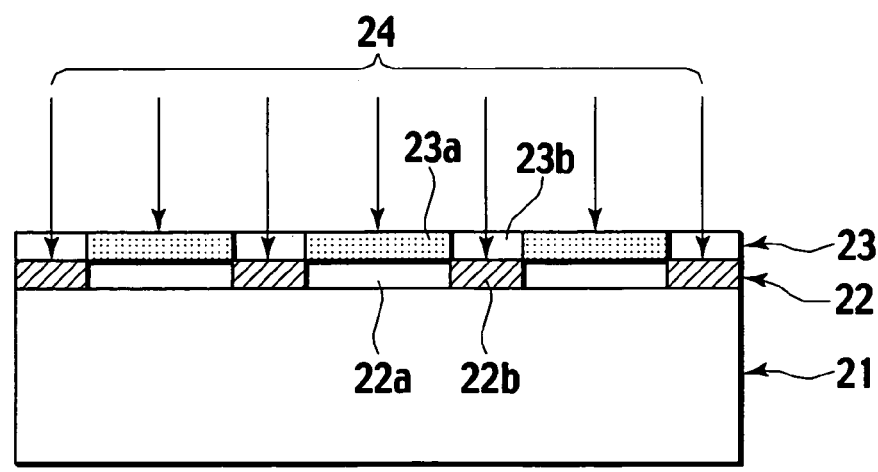

Then, in an exposing process illustrated in FIG. 8C, ultraviolet light 24 is irradiated towards the negative mask 23 from above. The ultraviolet light 24 does not penetrate the black portions 23a of the negative mask 23 but does the transparent portions 23b. Therefore, the ultraviolet light 24 creates an unexposed portion (unhardened portion) 22a in a position corresponding to the black portion 23a of the negative mask 23 and an exposed portion (hardened portion) 22b in a position corresponding to the transparent portion 23b of the negative mask 23.

Figure 8D:
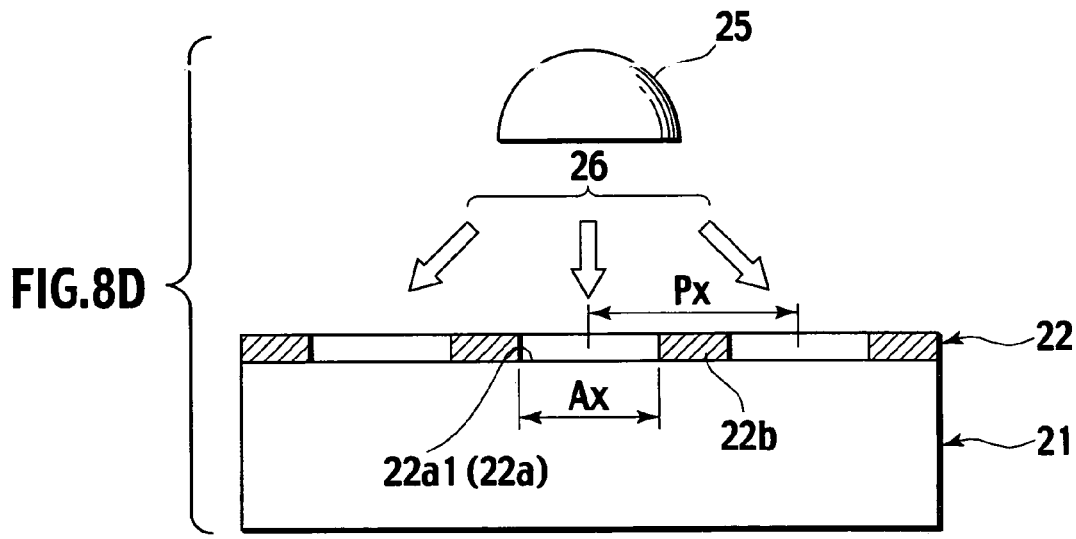

In a developing process illustrated in FIG. 8D, after the negative mask 23 (not shown in FIG. 8D) is removed, diluted sodium carbonate ($Na_2CO_3$) is spayed towards the dry film 22 from a developer container 25 placed over the dry film 22. The diluted sodium carbonate removes the unexposed portion 22a of the dry film 22 by making the portion 22a swollen, thereby leaving an opening 22a1 having the width Ax. On the other hand, the exposed portion 22b formed between adjacent two openings remains on the substrate 21, thereby serving as a mask portion against the fine powder blast abrasive 28 (FIG. 8E) described hereinafter. It should be noted that the openings 22a1 formed side-by-side in the dry film 23 maintain the above-stated pitch of Px.

Figure 8E:
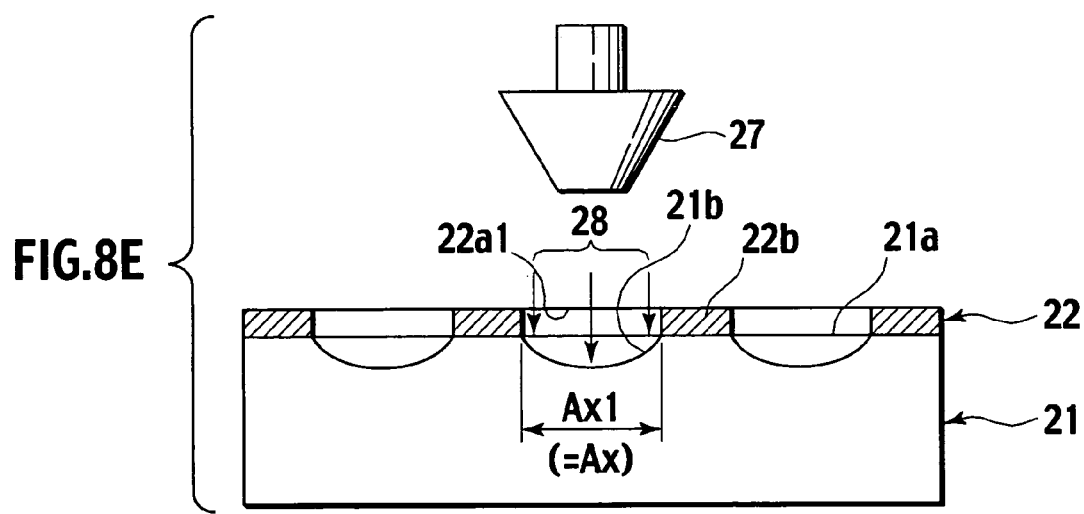

Next, in an early stage of a blast-grinding process illustrated in FIG. 8E, the fine powder blast abrasive 28 are blasted at high speed from a blast nozzle 27 placed above the dry film 22 towards the dry film 22 in a way that an amount of the abrasive 28 to be blasted per unit time is kept constant. In this situation, while each exposed portion 22b of the dry film 22 remains to serve as a mask to block the fine powder blast abrasive 28, the fine powder blast abrasive 28 passes through each opening 22a1 of the dry film 22 and collides with the upper surface 21a of the substrate 21. Accordingly, the fine powder blast abrasive 28 grinds a portion of the substrate 21, the portion having the same width as the width Ax of the opening 22a1 of the dry film 22, so as to form a concave portion 21b for a micro lens.

Figure 8F:
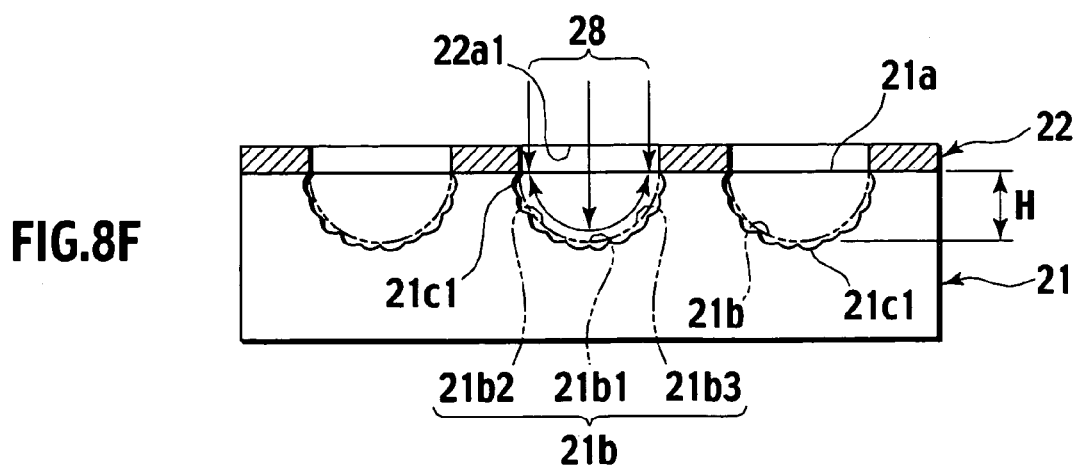

Next, in an ending stage of a blast-grinding process illustrated in FIG. 8F, in which the blast-grinding has further progressed, each concave portion 21b as a first concave portion for a micro lens is formed on the upper surface 21 side of the substrate 21 by the fine powder blast abrasive 28 until the depth of the concave portion 21b reaches a predetermined depth of H, where the predetermined depth H of each concave portion 21b for a micro lens corresponds to the height T (FIG. 5) of each micro lens 12a (FIGS. 3 and 5) to be formed. The depth is determined in advance when each micro lens 12a (FIGS. 3 and 5) is designed.

In the both stages of the blast-grinding process, while a penetration depth to which the fine powder blast abrasive 28 that has passed through the opening 22a1 after passing through the opening 22a1 can penetrate into the concave portion of the substrate 21 is deeper around the center 21b1 of each concave portion 21 for a micro lens, the depth is rather shallower in the peripheral areas 21b2, 21b3 of the concave portion 21b because the abrasive 28 undergoes a resistance in the areas.

The fine powder blast abrasive 28 that has reached the center 21b1 of each concave portion 21b moves towards the peripheral areas 21b2, 21b3 and exits out of the concave portion 21b from the peripheral areas 21b2, 21b3.

Under these circumstances, an amount of the fine powder blast abrasive 28 that reaches the peripheral areas 21b2, 21b3 of the concave portion 21b in the substrate 21 from the blast nozzle 26 becomes less along the radius of the concave portion 21. This is because such abrasive 28 that reaches the peripheral areas 21b2, 21b3 undergoes a resistance from the fine powder blast abrasive 28 that reaches the center 21b1, moves towards the peripheral areas 21b2, 21b3, and exits out from the peripheral areas. Therefore, the concave portions 21 for micro lenses are formed into a near hemispherical shape.

Also, a shape of the concave portion 21b for a micro lens to be formed on the upper surface 21a side of the substrate 21 depends on blasting conditions, it is necessary to find out the optimal blasting conditions in order to obtain a predetermined shape. A diameter of the fine powder blast abrasive 28 should be determined according to a predetermined depth H of the concave portion 21b for a micro lens. In order to improve a grinding performance, the particle diameter needs to be H/6 or less with respect to the predetermined depth H of the concave portion 21b for a micro lens. In addition, it is preferable when there are variations in the particle diameter of the fine powder blast abrasive 28 in order to easily form a hollow for sub-lenses in the inner surface of the concave portion 21b for a micro lens as described hereinafter. In case the predetermined depth H of the concave portion 21b for a micro lens is for example 25 to 50 micrometers and the substrate 21 is formed of glass, white alumina of #1000 to #3000 (Japanese Industrial Standards (JIS) R6001) is suitable as the abrasive 28.

When each concave portion 21b for a micro lens is ground approximately to the predetermined depth of H on the upper surface 21a side of the substrate 21, a plural of fine hollows 21c1 are formed along the inner surface of the concave portion 21b for a micro lens. The fine hollows do not always have the same area or size because of a variation in the particle diameter of the fine powder blast abrasive 28. The plural of fine hollows obtained here serves as an initial nucleus of a hollow 21c3 (FIG. 8I) for sub-lenses, as described hereinafter. By the way, the predetermined depth H of the concave portion 21b for a micro lens cannot be measured precisely because there are fine hollows 21c1 on the inner surface thereof.

Figure 8G:
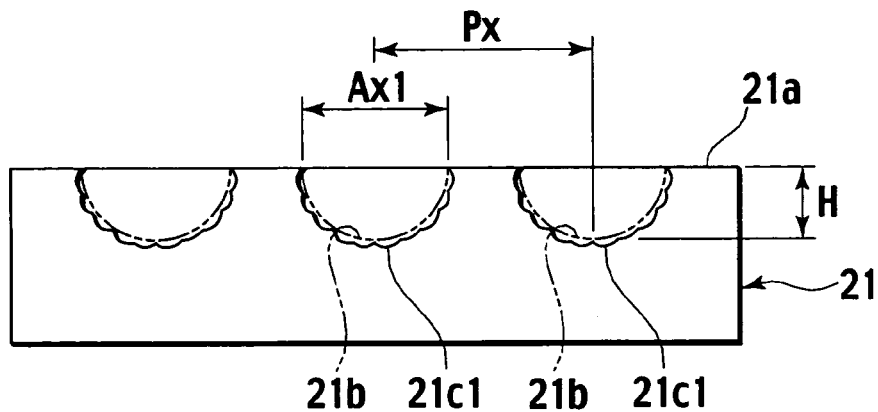

Next, in an early stage of an etching process illustrated in FIG. 8G, firstly, the dry film 22 (not shown in this figure) is removed from the upper surface 21a of the substrate 21. At this time, the substrate 21 has each concave portion 21b for a micro lens formed by grinding the upper surface 21a side of the substrate 21, the portion 21b having a width Ax1 and nearly the predetermined depth H, and a plural of the fine hollows 21c1 formed along the inner surface of the concave portion 21b for a micro lens, the hollows 21c1 not having the same size. Then, the substrate 21 is etched from the upper surface 21a side.

The etching performed here may be either wet or dry etching. When employing wet etching, HF etchant, for example, is suitable for a glass substrate as the substrate 21 and the pH and temperature thereof can control the etching rate of the substrate 21. On the other hand, when employing dry etching, carbon tetrachloride ($CCl_4$) is suitable as an etching gas, for example.

When either wet or dry etching is carried out, the etching conditions have to be set in advance so as to realize isotropic etching characteristic and controlled so that the predetermined depth H of the concave portion 21 for a micro lens formed by blast-grinding the substrate 21 remains constant even after the etching.

Figure 8H:
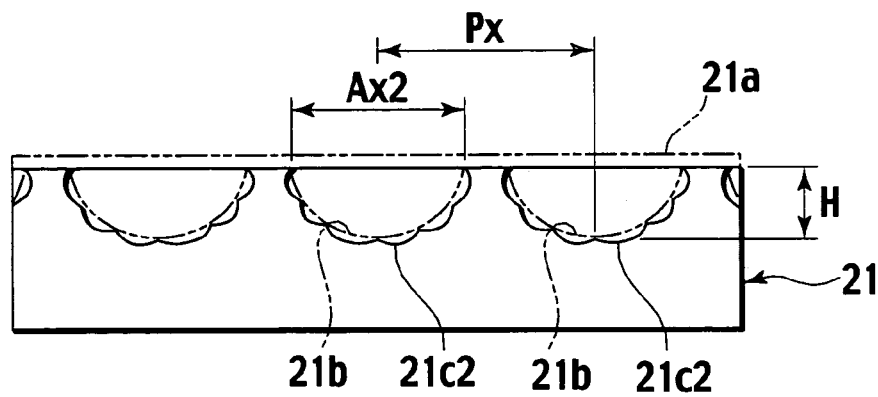

Next, in a mid stage of the etching process illustrated in FIG. 8H, when the substrate 21 is further etched by wet or dry etching, the upper surface 21a of the substrate 21 and the inside of each concave portion 21b for a micro lens are etched simultaneously. At this time, the pitch Px between adjacent two concave portions 21b formed on the upper surface 21a side of the substrate 21 is kept unchanged and a depth of the concave portion 21b for a micro lens is kept substantially at a predetermined depth of H. In addition, although the width Ax2 of the concave portion 21b for a micro lens becomes wider than the width Ax1 illustrated in FIG. 8G due to the etching, any adjacent two concave portions 21b have not yet contacted with each other.

Moreover, in the mid stage of the etching process, some of somewhat larger fine hollows 21c1 among the fine hollows 21c that have been formed along the inner surface of the concave portion 21b of the substrate 21, the fine hollows 21c not having the size, are grown into a larger hollows 21c2 while merging in other somewhat smaller fine hollows and hence decreasing the number of the fine hollows 21c. Some of the larger hollows 21c2 serve as an initial nucleus to be grown into a hollow for a sub-lens.

Figure 8I:
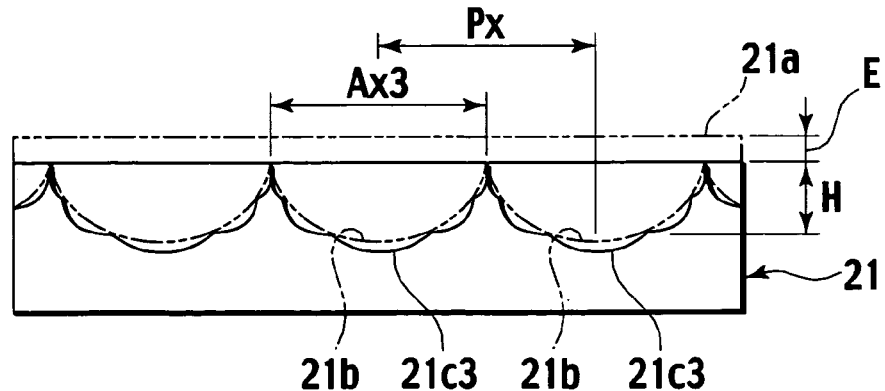

Then, when the etching further progresses, the process comes into an end stage of the etching process illustrated in FIG. 8I. At this stage, while the upper surface 21a side of the substrate 21 and the inside of the concave portion 21b for a micro lens are further etched, the pitch Px between adjacent two concave portions 21b formed on the upper surface 21b side of the substrate 21 and the predetermined depth H remain almost unchanged. However, a width Ax3 of each concave portion 21b for a micro lens becomes wider than the width Ax2 illustrated in FIG. 8H and thereby the adjacent two concave portions 21b have come into a contact with each other. Then, the etching process ends. At this time, since the adjacent two concave portions 21b are connected with each other, a plural of concave portions 21b for micro lenses having a near hemisphere shape come to be disposed closely in a hexagonal close-packed (honeycomb) arrangement on the upper surface 21a of the substrate 21.

As illustrated in FIG. 8I, a total etching amount E from the early to the end stage of the etching process is determined by the pitch Px of the adjacent two concave portions 21b for micro lenses and the width Ax1 (FIG. 8G) of the concave portions 21b for micro lenses, the width Ax1 being an width before etching. That is, the amount E of the upper surface 21a side of the substrate 21 is expressed in the following equation:

$$E=(Px-Ax1)/2 \quad (2)$$

During the etching process, since some of larger hollows 21c2 formed along the inner surface of the concave portions 21b for micro lenses in the substrate 21 are merged out, a plural of further large hollows 21c3 are finally formed along the inner surface of each concave portion 21b for a micro lens. The further large hollows 21c3 serve to form a plural of sub-lenses 12b (FIGS. 3 and 5) along the surface of micro lenses 21a (FIGS. 3 and 5).

The plural of hollows 21c3 for sub-lenses (a second concave portion) are smaller than the concave portion 21b (a first concave portion) and an area defined by the hollow 21c3 for sub-lenses is smaller than that by the concave portion 21b for a micro lens.

The substrate 21 that has undergone the etching process is now a replication mold for a micro lens array according to the first embodiment of the present invention.

Next, a manufacturing process for the micro lens array 12 (FIGS. 3 and 5) using the replication mold (the substrate 21) according to the first embodiment of the present invention will be described hereinafter with reference to FIGS. 9A to 9D, the mold having been produced by the above-mentioned method.

FIGS. 9A to 9D are a process chart that schematically illustrates process steps of manufacturing a micro lens array according to the first embodiment of the present invention using the replication mold for a micro lens array according to the first embodiment of the present invention.

Figure 9A:
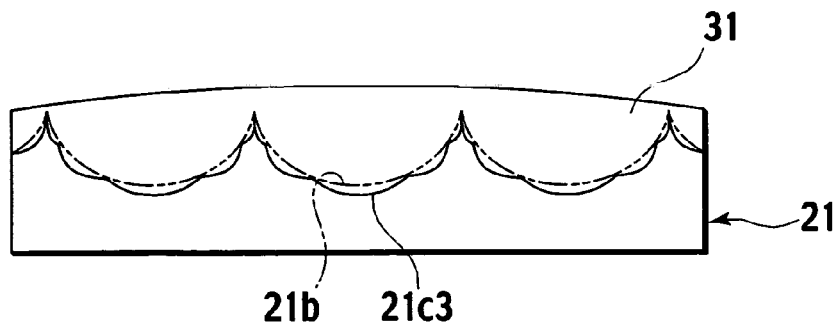
FIGS. 9A to 9D are a process chart that schematically illustrates process steps of manufacturing a micro lens array according to the first embodiment of the present invention using the replication mold for a micro lens array according to the first embodiment of the present invention.

Firstly, in a UV-hardening resin dispense process illustrated in FIG. 9A, the replication mold 21 (the substrate 21) for a micro lens array according to the first embodiment of the present invention includes a plural of hollows 21c3 for sub-lenses along the inner surface of each concave portion 21b formed on the upper surface 21a (not shown) thereof. To this replication mold 21 are dispensed a UV-hardening resin 31 from above. Though not shown, the replication mold 21 has a blocking member at the periphery thereof that prevents the UV-hardening resin 31 from flowing down therefrom.

Figure 9B:
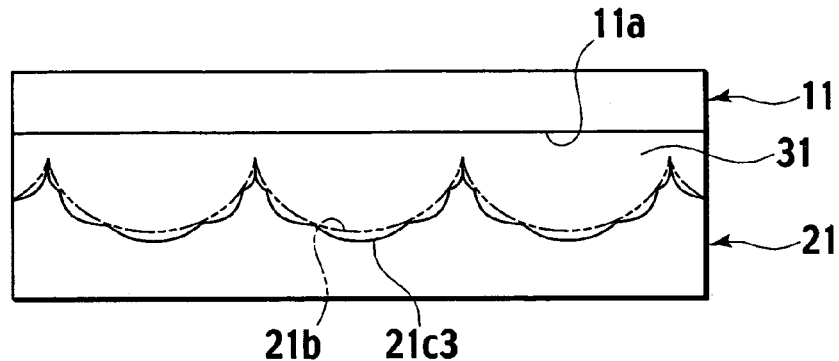

Then, in a lens substrate disposing process illustrated in FIG. 9B, a lens substrate 11 is placed onto the UV-hardening resin 31 that has been dispensed over the replication mold 21 (the substrate 21) for a micro lens array. When the lens substrate 11 is placed, the flat upper surface (i.e., a lower surface in FIG. 9B) thereof presses and spreads the UV-hardening resin 31 evenly into each concave portion 21b for a micro lens and the hollows 21c3 for sub-lenses.

Figure 9C:
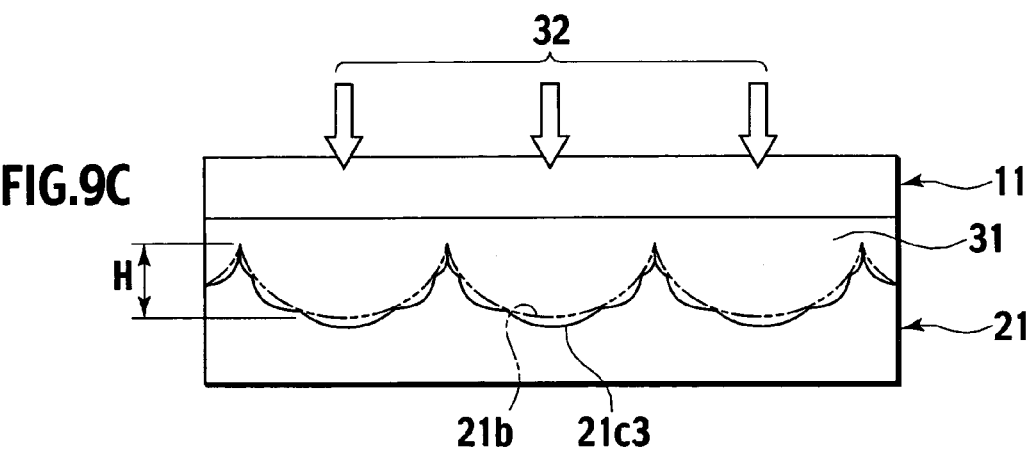

Next, in a UV light exposing process illustrated in FIG. 9C, the UV-hardening resin 31 is hardened by exposing UV-light 32 from above the lens substrate 11. With this, the shape of each concave portion 21b for a micro lens formed in the replication mold 21 (the substrate 21) for a micro lens array and also the shape of the plural of hollows 21c3 for sub-lenses formed in the inner surface of each concave portion 21b for a micro lens are replicated to the UV-hardening resin 31.

Figure 9D:
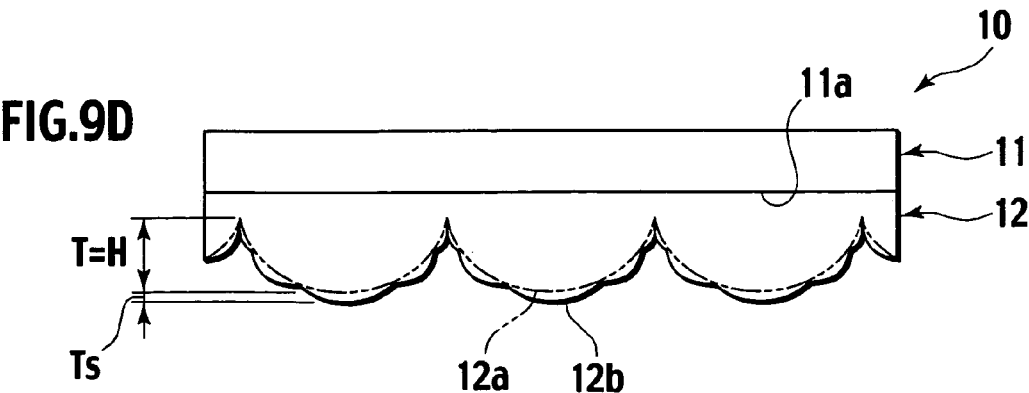

Then, in a mold removing process illustrated in FIG. 9D, when the replication mold 21 (not shown) is peeled off from the hardened UV-hardening resin 31, the micro lens array 12 according to the first embodiment of the present invention is obtained. The micro lens array 12 includes a plural of micro lenses 12a that have been formed corresponding to the concave portion 21b for a micro lens, the micro lenses 12a protruding on the upper surface 11a (i.e., a lower surface in FIG. 9D) of the lens substrate 11 and a plural of sub-lenses 12b that have been formed corresponding to the hollows 21c3, the sub-lenses 12b protruding slightly from the surface of each micro lens 12a. The height T of each micro lens 12a in the micro lens array 12 is substantially the same as the predetermined depth H of the concave portion 21b for a micro lens in the lens substrate 11. Also, the height $T_s$ of the sub-lens 12b is substantially the same of the depth of the hollows 21c3 for sub-lenses. After undergoing the above procedures, a micro lens array element 10 is completed.

By the way, in manufacturing the micro lens array 12 above, while the micro lens array 12 is formed integrally with the lens substrate 11, a removable plate having a flat surface to be contacted with the UV-hardening resin can be used to press the resin instead of the lens substrate 11. With such a plate, a micro lens array element having no lens substrate is obtained.

Next, the method of manufacturing a replication mold for a micro lens array, according to the first embodiment of the present invention, will be described in detail with reference to examples 1 and 2. Each constituent element or member to be used in the examples 1, 2 is given the same reference mark as in FIGS. 8 and 9, thereby omitting a process chart of the method in the following examples.

EXAMPLE 1

Firstly, a soda glass substrate 21 having a thickness of 3 mm was prepared as a starting material for a replication mold for a micro lens array. Then, a dry film 22 of 50 micrometer thick was pressed onto the upper surface 21a of the soda glass substrate 21 and heated to be attached thereon.

Next, a negative mask 23 having alternatively a black portion 23a for blocking light and a transparent portion 23b for allowing light to pass therethrough was placed on the dry film 22. In the negative mask 23, a pitch Px between adjacent two black portions 23a was set, for example, to be 90 micrometers. By the way, a plural of negative masks 23 having the same pitch Px of 90 micrometers and a respectively different width Ax along the X-axis of each black portion 23a were prepared in advance.

Then, UV-light 24 was exposed to the negative mask 23 from above, thereby forming an unexposed (unhardened) portion 22a at a position in the dry film 22, the position corresponding to each black portion 23a, and an exposed position (hardened) portion 22a at a position in the dry film 22, the position corresponding to each transparent portion 23a.

Next, the negative mask 23 was removed from the dry film 22 and the dry film 22 was cleaned using 10% sodium carbonate. Due to the cleaning, the unexposed portions 22a of the dry film 22 was removed, thereby forming an opening 22a1 having a width Ax. On the other hand, the exposed portion 22b of the dry film 22 remained on the soda glass substrate 21, thereby obtaining a mask to be used in a blast-grinding process described hereinafter.

Fine powder abrasive 28 (white aluminum, #1500 (JIS R6001)) was blasted out from a blast nozzle 27 placed above the dry film 22 towards the dry film 22 and the fine powder blast abrasive 28 that passed through the openings 22a1 ground the upper surface 21a side of the soda glass substrate 21, thereby forming concave portions 21b for micro lenses, the concave portions 21b having a near hemisphere shape a pitch of Px between their adjacent ones. The upper surface 21a of the soda glass substrate 21 was ground until the depth H of each micro lens concave portion 21b became equal to the height T (FIGS. 5 and 9D) of the micro lens 12a to be formed.

Then, after the dry film 22 was removed from the soda glass substrate 21, the upper surface 21a of the soda glass substrate 21 and the concave portion 21b were etched with an HF etchant. During the etching, a plural of fine hollows 21c1 were formed and then grown gradually to be larger (see 21c1, 21c2, and 21c3 in FIGS. 8G, 8H, and 8I, respectively), thereby obtaining a hollow 21c3 for sub-lenses. When the etching of the upper surface 21a of the soda glass substrate 21 continues until an etching amount E becomes (Px−Ax)/2, the concave portions 21b for micro lenses were grown to contact with the adjacent ones and disposed in a hexagonal close-packed arranged. The soda glass substrate 21 was now a replication mold for a micro lens array according to the first embodiment of the present invention.

Next, a UV-light hardening resin 31 was dispensed onto the replication mold 21 (the soda glass substrate 21) for a micro lens array, and a poly carbonate film 11 having a thickness of 30 micrometers was laid as a lens substrate on the UV-light hardening resin 31. Then, the UV-light 31 was exposed to the UV-hardening resin 31 through the polycarbonate film 11 from above, thereby hardening the UV-light hardening resin 31. After the replication mold 21 (the soda glass substrate 21) for a micro lens array was peeled off, each micro lens 12a was protrusively formed on the upper surface 11a side of the polycarbonate film 11 in accordance with each concave portion 21b for a micro lens. Also, corresponding to the plural of hollows 21c3 for sub-lenses, a plural of sub-lenses 12b were formed to slightly protrude from the surface of each micro lens 12a. After all the procedures above, the micro lens array 12 according to this invention was completed.

In Example 1, while the pitch Px of the opening 22a1 formed in the dry film 22 along the X-axis direction was maintained at 90 micrometers for example, the average sub-lens bottom face width (or the average sub-lens bottom face diameter) $D_{sav}$ of the plural of sub-lenses 12b formed along the surface of the micro lens 12 formed by using the soda glass substrate 21 was controlled by changing the width Ax of the opening 22a1. The measurement result obtained from various micro lens arrays having a respectively different $D_{sav}$ was shown in FIG. 10A. In FIG. 10A, D is the micro lens bottom face width (or the micro lens bottom face diameter) and $D_{sav}$ was the average sub-lens bottom face width (or the average sub-lens bottom face diameter) obtained by averaging a plural of the sub-lens bottom face widths $D_s$.

From FIG. 10A, it was found that when the width Ax of the openings 22a1 in the dry film 22 was changed, the micro lens bottom face width (the micro lens bottom face diameter) D remains almost constant at 90 micrometers for example and thus the adjacent two micro lenses 12a were in contact with each other. In addition, the height T (FIGS. 5 and 9D) of each micro lens 12a was about half of the above-mentioned micro lens bottom face width (the micro lens bottom face diameter) D.

On the other hand, the average sub-lens bottom face width $D_{sav}$ obtained by averaging the sub-lens bottom face width $D_s$ of each of the plural of sub-lenses 12b formed along the surface of each micro lens 12b, or the average sub-lens bottom face diameter $D_{sav}$ obtained by averaging the sub-lens bottom face diameter $D_s$ of each of the plural of sub-lenses 12b formed along the surface of each micro lens 12b becomes smaller as the width Ax of the opening 22a1 in the dry film 22 increases. In addition, the height $T_s$ (FIGS. 5 and 9D) of each sub-lens 12b was about one fifth to one twentieth of the above-mentioned average sub-lens bottom face width (the average sub-lens bottom face diameter) $D_{sav}$.

By the way, the gain and view angle of half intensity of the micro lens arrays obtained in Example 1 were substantially the same as in FIG. 6A.

EXAMPLE 2

In Example 2, the micro lens array was manufactured in the same way as Example 1 except that the pitch Px of the openings 22a1 in the dry film 22 was set to be 30 micrometers. The results are listed in FIG. 10B. In FIG. 10B, D is the micro lens bottom face width or the micro lens bottom face diameter as described above, and $D_{sav}$ is the average sub-lens bottom face width obtained by averaging a plural of the sub-lens bottom face widths $D_s$ or the average sub-lens bottom face diameter obtained by averaging a plural of the sub-lens bottom face diameters $D_s$.

From FIG. 10B, it is found that substantially the same result as Example 1 is obtained. In other words, when the width of opening 22a1 in the dry film 22 is changed, the micro lens bottom face width (micro lens bottom face diameter) D remains substantially constant at 130 micrometers for example. This result suggests that any adjacent two micro lens 12a be in a close contact with each other. In addition, the height T (FIGS. 5 and 9D) of each micro lens 12a is about half of the above-mentioned micro lens bottom face width (micro lens bottom face diameter) D.

On the other hand, it has been found that the average sub-lens bottom face width $D_{sav}$ obtained by averaging the sub-lens bottom face width $D_s$ of each of the plural of sub-lenses 12b formed along the surface of each micro lens 12b, or the average sub-lens bottom face diameter $D_{sav}$ obtained by averaging the sub-lens bottom face diameter $D_s$ of each of the plural of sub-lenses 12b formed along the surface of each micro lens 12b becomes smaller as the width Ax of the opening 22a1 in the dry film 22 increases. In addition, the height $T_s$ (FIGS. 5 and 9D) of each sub-lens 12b is about one fifth to one twentieth of the above-mentioned average sub-lens bottom face width (the average sub-lens bottom face diameter) $D_{sav}$.

By the way, the gain and view angle of half intensity of the micro lens arrays obtained in Example 2 are the same as in FIG. 6B.

<Comparison 1>

By way of comparison, a micro lens array was produced in the same conditions as Example 1 except that the pitch Px of the adjacent two opening 22a1 in the dry film 22 is set to be 25 micrometers. An etching amount is 75 micrometers and no sub-lenses were formed in the micro lens array for comparison.

<Comparison 2>

By way of comparison, a micro lens array was produced in the same conditions as Example 2 except that the pitch Px of the adjacent two opening 22a1 in the dry film 22 is set to be 55 micrometers. An etching amount is 75 micrometers and no sub-lenses were formed in the micro lens array for comparison.

According to a method of manufacturing a replication mold for a micro lens array of the first embodiment of the present invention stated above, since blast-grinding and etching are co-employed to closely form a plural of concave portions 21b on the upper surface 21a side of the substrate 21 and to form a plural of hollows 21c3 for sub-lenses along the surface of each concave portion for a micro lens, a replication mold for a micro lens array for manufacturing a micro lens array 12 in which a plural of sub-lenses 12b are protrusively formed on the surface of each micro lens 12a is obtained conveniently and less costly. Moreover, since blast-grinding and etching are co-employed, the replication mold for a micro lens array is obtained at shorter times.

Second Embodiment

FIGS. 11A to 11J are a schematic view illustrating a method of manufacturing a replication mold for a micro lens according to the second embodiment of the invention.

In the method of manufacturing a replication mold for a micro lens according to the second embodiment, substantially the same technical idea as in the first embodiment is adopted. That is, in the method, a plural of concave portions 21b for micro lenses are formed by blast-grinding the upper surface 21a of the substrate 21' as a starting material for a replication mold for a micro lens array 12' (FIG. 12D). However, the method according to the second embodiment is characterized in that a plural of hollows 21c3 for sub-lenses, the hollows 212c3 being formed along the inner surface of each concave portion 21b for a micro lens by blast-grinding and etching, is further etched and thus removed completely, thereby forming a plural of concave portions 21b for micro lenses, without any hollows for sub-lenses, on the upper surface 21a side of the substrate 21'.

Although a reference mark 21' is given to the substrate in FIGS. 11A to 11J in the second embodiment while the substrate used in the first embodiment is referred to as the reference mark 21, procedures illustrated in FIGS. 11A to 11F are substantially the same as those illustrated in FIGS. 8A to 8F in the first embodiment. The same procedures as shown in the first embodiment are not mentioned in the second embodiment and only an etching process that is different from that in the first embodiment will be explained with reference to FIGS. 11G to 11J.

Figure 11A:
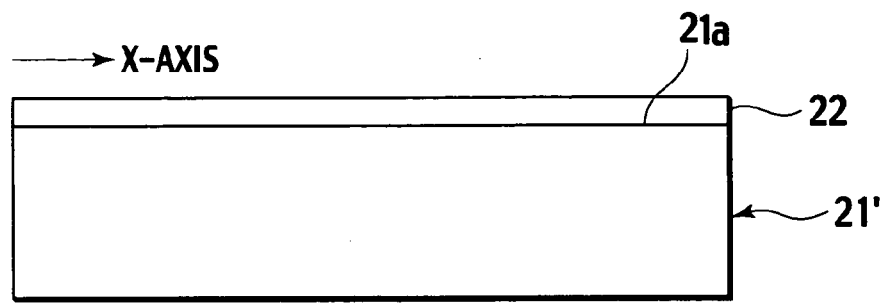
FIGS. 11A to 11J are a schematic view illustrating a method of manufacturing a replication mold for a micro lens according to the second embodiment of the invention.
Figure 11B:
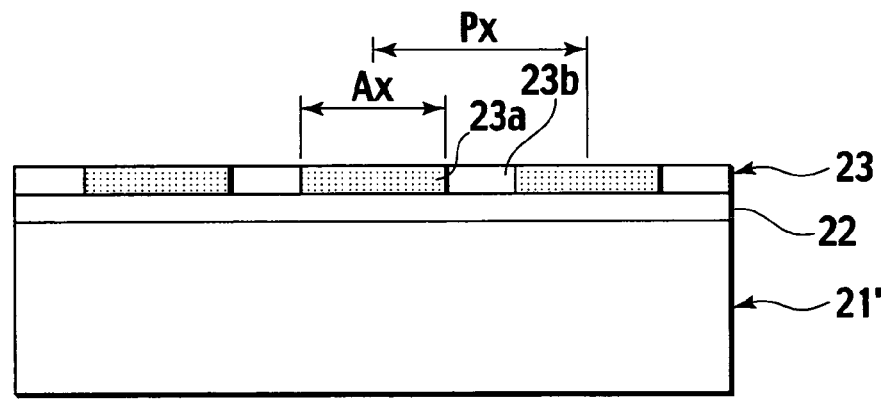
Figure 11C:
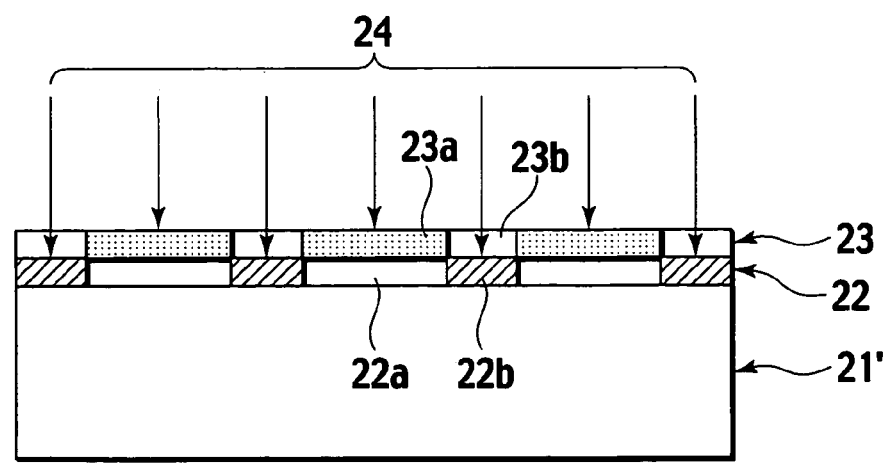
Figure 11D:
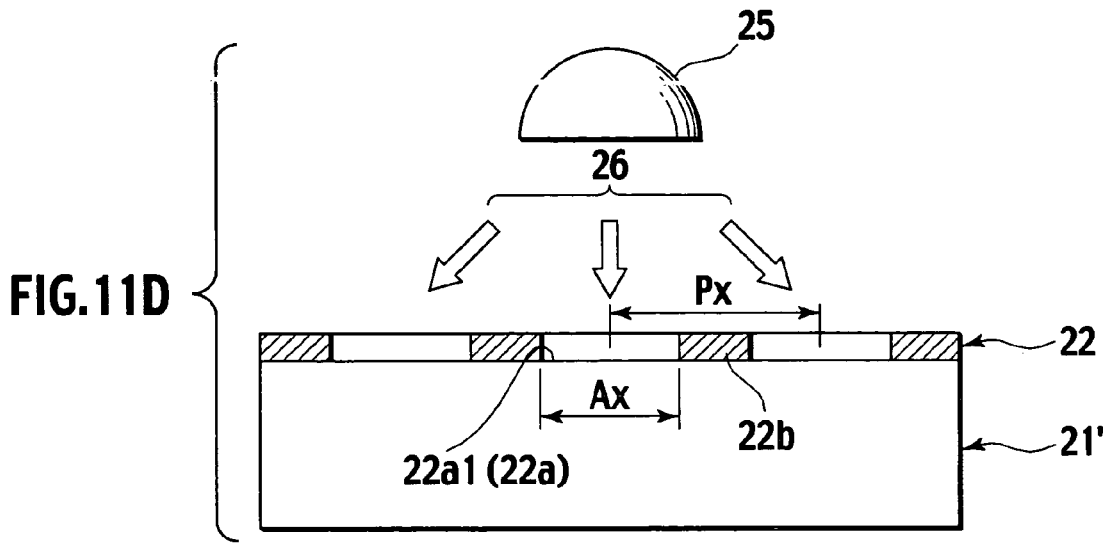
Figure 11E:
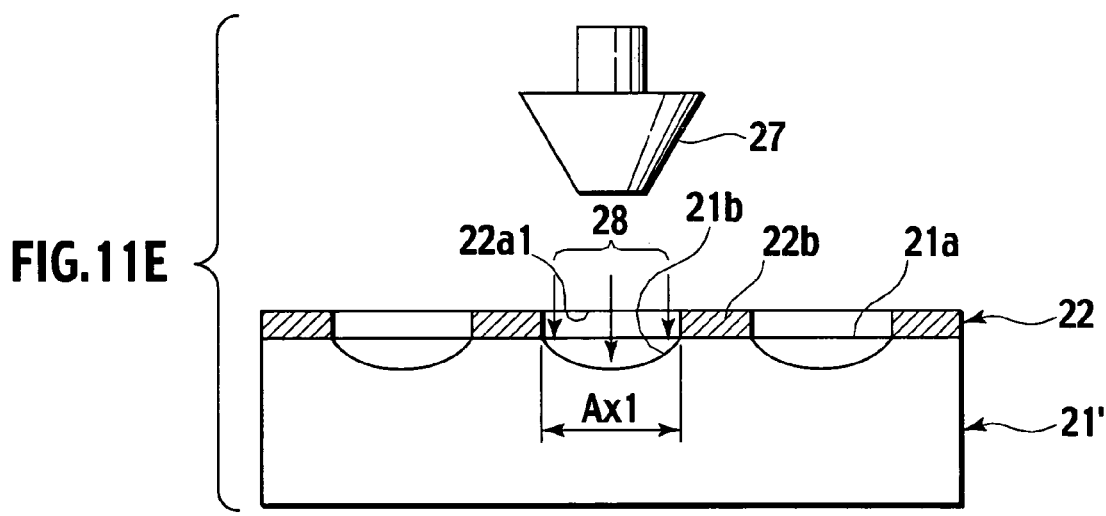
Figure 11F:
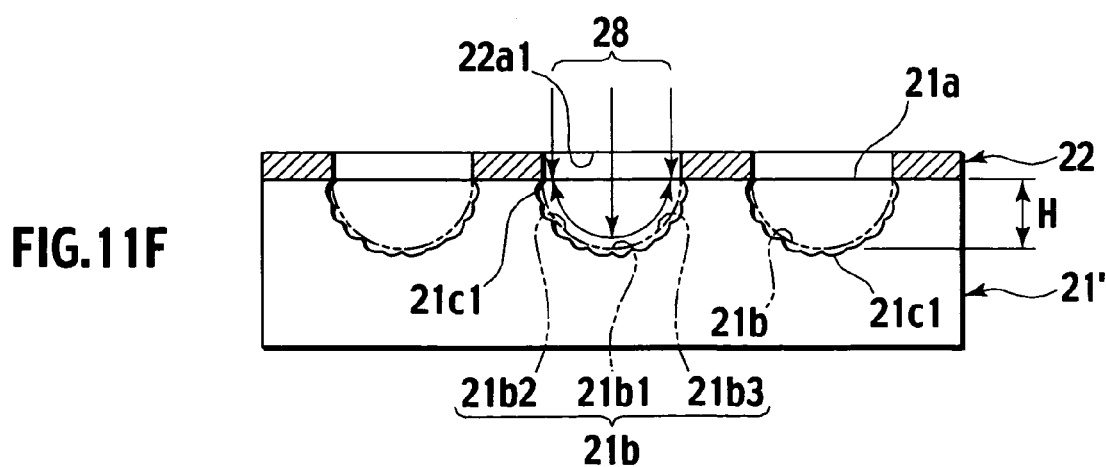
Figure 11G:
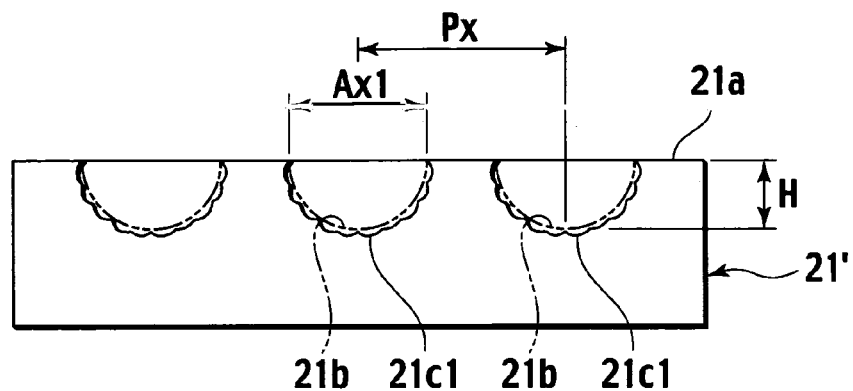

In an early stage of an etching process illustrated in FIG. 11G, an upper surface 21a side of the substrate 21' is blast-ground by fine powder blast abrasive 28 (not shown) so that each concave portion 21b for a micro lens is formed so as to have a width Ax and a predetermined depth H. Then, the substrate 21' including a plural of fine hollows 21c1 not having the same size along the inner surface of each concave portion 21b for a micro lens is wet or dry etched from the upper surface 21a side. Although the predetermined depth H of each concave portion 21b for a micro lens is substantially the same as the height T (FIGS. 5 and 9D) of the micro lens 12a in the micro lens array 12 (FIGS. 3, 5 and 9D) in the first embodiment, the depth H is set to be slightly greater than the height T' of the micro lens 12a in the micro lens array 12' (FIG. 12D) (described hereinafter) in the second embodiment.

Figure 11H:
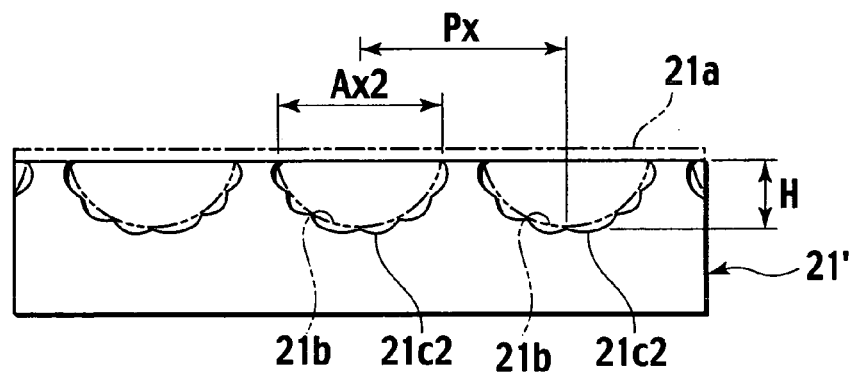

Then, in a first mid stage of the etching process illustrated in FIG. 11H, when the substrate 21' is further etched by wet or dry etching, the upper surface 21a side of the substrate 21' and the inside of the concave portion 21b for a micro lens are etched. At this time, the pitch Px of the adjacent two concave portions 21b for micro lenses formed on the upper surface 21a of the substrate 21' remains almost constant. In addition, in each concave portion 21b for a micro lens, the predetermined depth H remains unchanged. Although the width Ax2 of the concave portion 21b for a micro lens becomes slightly larger than the width illustrated in FIG. 11G, the width Ax2 still exists so as to prevent the adjacent two concave portions 21b for micro lenses from being contact with each other.

Moreover, in the etching process mentioned above, some of somewhat larger fine hollows among the fine hollows 21c1 formed along the inner surface of the concave portion 21b of the substrate 21', the fine hollows 21c1 not having the same size, are grown into a larger hollows 21c2 while merging in other fine hollows 21c1 and thus decreasing the number of the fine hollows 21c. Some of the larger hollows 21c2 serve as an initial nucleus to be grown into a hollow for a sub-lens.

Figure 11I:
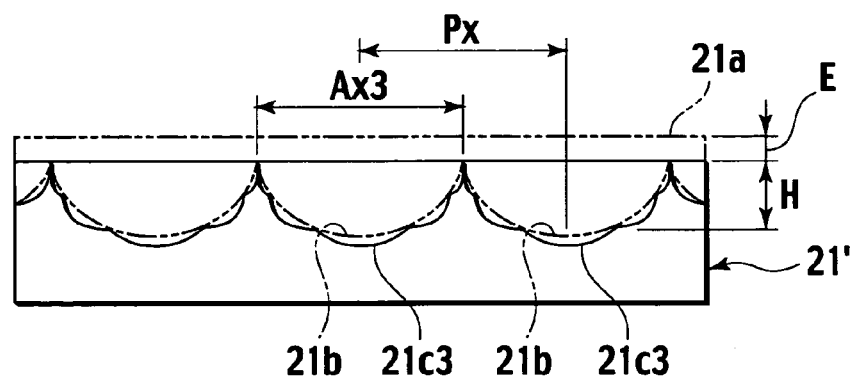

Next, in a second mid stage of an etching process illustrated in FIG. 11I, the upper surface 21a side of the substrate 12' and the inside of the concave portion 21b for a micro lens are etched further. At this time, the pitch Px of the adjacent two micro lenses formed on the upper surface 21a side of the substrate 21' remains constant. In addition, in each concave portion 21b for a micro lens, the predetermined depth H is maintained. However, the width Ax3 of each concave portion 21b for a micro lens becomes larger than Ax2 illustrated in FIG. 11H and thereby the adjacent two concave portions 21b are in contact with each other. Then, the plural of the concave portions 21b for micro lenses are closely disposed in a hexagonal close-packed (honeycomb) arrangement, the concave portions 21b having a near hemisphere shape. At this time, a total etching amount from the early to the second mid stage of the etching process amounts to E.

In addition, during the above-mentioned etching process, some of the plural of larger hollows 21c2 formed along the inner surface of each concave portion 21b for a micro lens in the substrate 21' are merged. As a result, a plural of further larger hollows 21c3 for sub-lenses are formed along the inner surface of each concave portion 21b. While the etching process is completed at this stage in the first embodiment, further etching is carried out in the second embodiment.

Figure 11J:
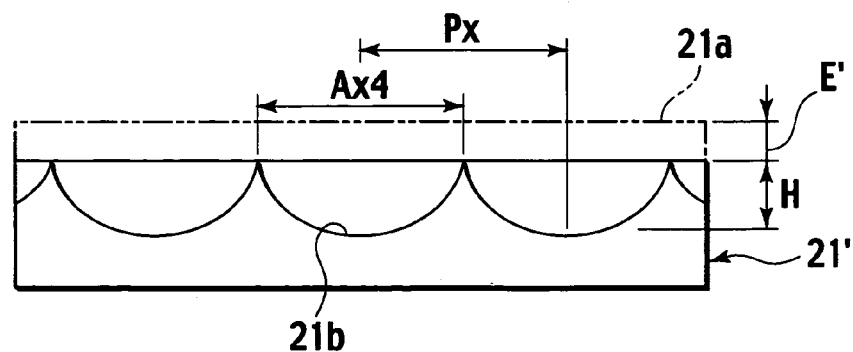

When the substrate 21' illustrated in FIG. 11I is further etched, the process comes to an ending stage illustrated in FIG. 11J. In this stage, because of continued etching, the plural of the hollows 21c3 for sub-lenses formed along the inner surface of each concave portion 21b for a micro lens in the substrate 21' disappear. Therefore, there are formed only the concave portions 21b that have a near hemisphere shape with a smooth inner surface. Although the width Ax4 of each concave portion 21b becomes larger than the width Ax3 illustrated in FIG. 11I, the pitch Px of the adjacent two concave portions 21b for micro lenses remains unchanged. The adjacent two concave portions 21b are in contact with each other. A total etching amount from the early to the ending stage of the etching process is now equal to E'. Although the etching amount E' is apparently larger than the amount E illustrated in FIG. 11I, the predetermined depth H of the concave portion 21b for a micro lens remains substantially unchanged.

Then, the substrate 21' that have undergone the above-mentioned etching process is now a replication mold for a micro lens array according to the second embodiment of the present invention.

Next, a manufacturing process for the micro lens array using the replication mold 21' (the substrate 21') made by the above-mentioned method according to the second embodiment of the present invention will be described with reference to FIGS. 12A to 12D.

FIGS. 12A to 12D are a process chart that schematically illustrates a process step of manufacturing a micro lens array according to the second embodiment of the present invention using the replication mold for a micro lens array according to the second embodiment of the present invention.

Figure 12A:
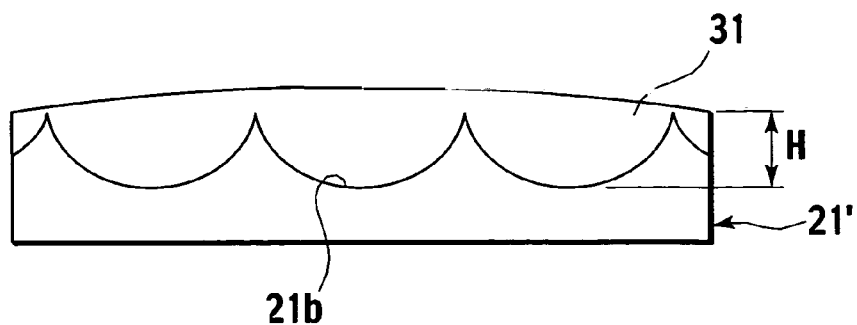
FIGS. 12A to 12D are a process chart that schematically illustrates a process step of manufacturing a micro lens array according to the second embodiment of the present invention using the replication mold for a micro lens array according to the second embodiment of the present invention.

Firstly, in a UV-hardening resin dispense process illustrated in FIG. 12A, the replication mold 21' (the substrate 21') for a micro lens array according to the second embodiment of the present invention includes a plural of concave portions 21b for micro lenses that are closely arranged on the upper surface 21a (not shown) thereof. In addition, each concave portion 21b for a micro lens has a predetermined depth H. The UV-hardening resin 31 is dispensed onto the replication mold 21 from above.

Figure 12B:
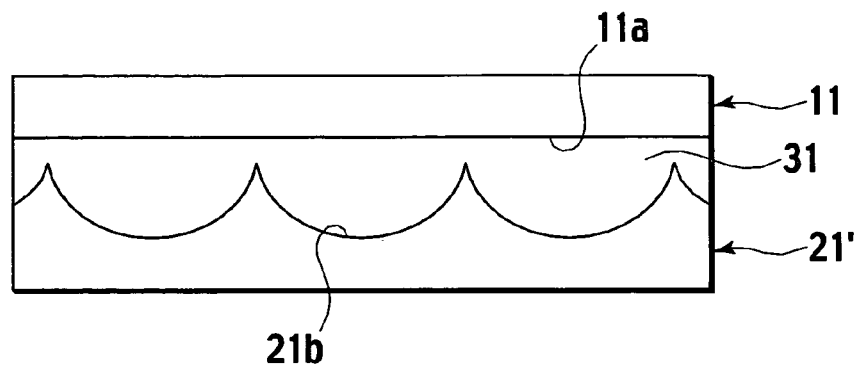

Then, in a lens substrate disposing process illustrated in FIG. 12B, a lens substrate 11 is placed onto the UV-hardening resin 31 dispensed over the replication mold 21' (the substrate 21') for a micro lens array. When the lens substrate 11 is placed, the flat upper surface (lower in FIG. 9B) thereof presses and spreads the UV-hardening resin 31 evenly into each concave portion 21b.

Figure 12C:
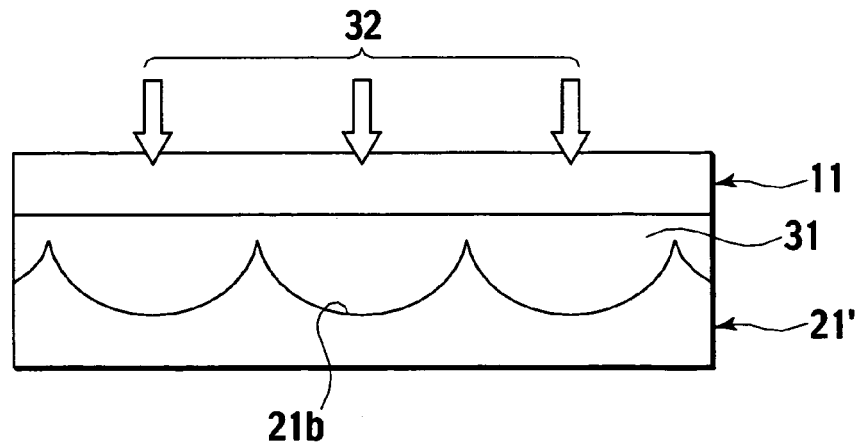
Figure 12D:
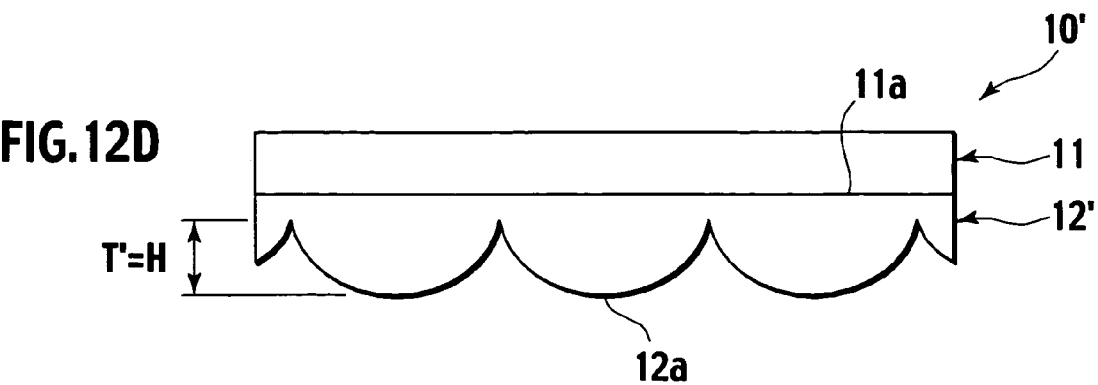

Next, in a UV light exposing process illustrated in FIG. 12C, the UV-hardening resin 31 is hardened by exposing UV-light 32 from above the lens substrate 11. As a result, the shape of each concave portion 21b for a micro lens formed in the replication mold 21' (the substrate 21') for a micro lens.

Then, in a mold removing process illustrated in FIG. 12D, when the replication mold 21' (not shown) is peeled off from the hardened UV-hardening resin 31, the micro lens array 12' according to the second embodiment of the present invention is obtained. The micro lens array 12' includes a plural of micro lenses 12a that have been made corresponding to the concave portions 21b for micro lenses, the micro lenses 12a protruding from the upper surface 11a (lower in FIG. 9D) of the lens substrate 11 and having no sub-lenses. The height T' of each micro lens 12a in the micro lens array 12' is substantially the same as the predetermined depth H of the concave portion 21b for a micro lens in the lens substrate 11. With the above procedures, a micro lens array element 10' is finished.

By the way, when manufacturing the micro lens array 12' above, while the micro lens array 12 is formed integrally with the lens substrate 11, a removable plate having a flat surface to be contacted with the UV-hardening resin can be used to press the resin instead of the lens substrate 11. With such a plate, a micro lens array element having no lens substrate is obtained.

According to the method of manufacturing the replication mold for a micro lens array according to the second embodiment of the present invention stated above, since blast-grinding and etching are co-employed to closely form a plural of concave portions 21b on the upper surface 21a of the substrate 21' and then a plural of hollows 21c3 for sub-lenses that have been formed along the inner surface of each concave portion for a micro lens are etched off to disappear, the replication mold 12' for a micro lens array in which each micro lens 12a has no sub-lenses 12b on the surface thereof is obtained conveniently and less costly. Moreover, since blast-grinding and etching are co-employed, the replication mold 21' for a micro lens array is obtained at shorter times.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A micro lens array comprising:
a plurality of micro lenses that are formed protrusively substantially in a shape of a hemisphere, and having one of a circular or a noncircular bottom face, said micro lenses being closely arranged in two dimensions, and
a plurality of convex sub-lenses that are protrusively formed along the surface of said each micro lens so as to have one of a circular or a noncircular bottom face, said sub-lenses having a smaller curvature radius than that of said micro lenses, wherein
said micro lens array is configured so that $D_{sav}/D$ is in a range from 0.1 to 0.3,
where D is a micro lens bottom face width obtained by halving the summation of the maximum and the minimum width which are measured along a line passing through the center of the bottom face of said micro lens when the bottom face of said micro lens is not circular, or is a micro lens bottom face diameter when the bottom face of said micro lens is circular; $D_s$ is a sub-lens bottom face width obtained by halving the summation of the maximum and the minimum width which are measured along a line passing through the center of the bottom face of said sub-lens when the bottom face of said sub-lens is not circular, or is a sub-lens bottom face diameter when the bottom face of said sub-lens is circular; and $D_{sav}$ is an average sub-lens bottom face width obtained by averaging a plurality of said sub-lens bottom face widths $D_s$, or is an average sub-lens bottom face diameter obtained by averaging a plurality of said sub-lens bottom face diameters Ds.

2. A micro lens array comprising:
a plurality of convexly protruded micro lenses that are formed protrusively in a shape of substantial hemisphere so as to have a circular or a noncircular bottom face, said micro lenses being are closely arranged in two dimensions, and a plurality of convex sub-lenses that are protrusively formed along the surface of said each micro lens so as to have a circular or a noncircular bottom face, said sub-lenses having a smaller curvature radius than that of said micro lenses, wherein said micro lens array is configured so that $T_{sav}/D_{sav}$ is 0.1 or more, where $D_s$ is a sub-lens bottom face width obtained by halving the summation of the maximum and the minimum width which are measured along a line passing through the center of the bottom face of said sub-lens when the bottom face of said sub-lens is not circular, or is a sub-lens bottom face diameter when the bottom face of said sub-lens is circular; $D_{sav}$ is an average sub-lens bottom face width obtained by averaging a plurality of said sub-lens bottom face widths $D_s$, or is an average sub-lens bottom face diameter obtained by averaging a plurality of said sub-lens bottom face diameters $D_s$; $T_s$ is a sub-lens height; and $T_{sav}$ is an average height obtained by averaging a plurality of said sub-lens heights $T_s$.

3. A micro lens array comprising:

a plurality of convexly protruded micro lenses that are formed protrusively in a shape of substantial hemisphere so as to have a circular or a noncircular bottom face., said micro lenses being are closely arranged in two dimensions, and a plurality of convex sub-lenses that are protrusively formed along the surface of said each micro lens so as to have a circular or a noncircular bottom face said sub-lenses having a smaller curvature radius than that of said micro lenses, wherein said micro lens array is configured so that $D_{sav}/D$ is in a range from 0.1 to 0.3 and also $T_{sav}/D_{sav}$ is 0.1 or more, where $D_s$ is a sub-lens bottom face width obtained by halving the summation of the maximum and the minimum width which are measured along a line passing through the center of the bottom face of said sub-lens when the bottom face of said sub-lens is not circular, or is a sub-lens bottom face diameter when the bottom face of said sub-lens is circular; $D_{sav}$ is an average sub-lens bottom face width obtained by averaging a plurality of said sub-lens bottom face widths $D_s$, or is an average sub-lens bottom face diameter obtained by averaging a plurality of said sub-lens bottom face diameters $D_s$; $T_s$ is a sub-lens height; and $T_{sav}$ is an average height obtained by averaging a plurality of said sub-lens heights $T_s$.

* * * * *

UNITED STATES PATENT AND TRADEMARK OFFICE
CERTIFICATE OF CORRECTION

PATENT NO.         : 7,110,643 B2                                       Page 1 of 1
APPLICATION NO.  : 11/049633
DATED                 : September 19, 2006
INVENTOR(S)        : Sugiyama et al.

It is certified that error appears in the above-identified patent and that said Letters Patent is hereby corrected as shown below:

Claim 3, Column 24, Line 5,
Please delete
"face" and replace with -- face, --

Signed and Sealed this

Twelfth Day of December, 2006

JON W. DUDAS
*Director of the United States Patent and Trademark Office*